United States Patent
Wang et al.

(10) Patent No.: US 8,379,721 B2
(45) Date of Patent: Feb. 19, 2013

(54) TWO PASS RATE CONTROL TECHNIQUES FOR VIDEO CODING USING A MIN-MAX APPROACH

(75) Inventors: Haohong Wang, San Diego, CA (US); Narendranath Malayath, San Diego, CA (US)

(73) Assignee: QUALCOMM Incorported, San Diego, CA (US)

( * ) Notice: Subject to any disclaimer, the term of this patent is extended or adjusted under 35 U.S.C. 154(b) by 1966 days.

(21) Appl. No.: 11/303,618

(22) Filed: Dec. 15, 2005

(65) Prior Publication Data

US 2007/0064794 A1    Mar. 22, 2007

Related U.S. Application Data

(60) Provisional application No. 60/719,775, filed on Sep. 22, 2005.

(51) Int. Cl.
    *H04N 11/04* (2006.01)
(52) U.S. Cl. .................. 375/240.14; 375/265
(58) Field of Classification Search .............. None
    See application file for complete search history.

(56) References Cited

U.S. PATENT DOCUMENTS

| | | | |
|---|---|---|---|
| 5,978,544 A | 11/1999 | Shimada et al. | |
| 6,011,589 A * | 1/2000 | Matsuura et al. | 375/240.14 |
| 6,023,296 A * | 2/2000 | Lee et al. | 375/240.05 |
| 6,697,529 B2 | 2/2004 | Kuniba | |
| 6,864,909 B1 * | 3/2005 | Horowitz | 348/14.12 |
| 7,418,147 B2 * | 8/2008 | Kamaci et al. | 382/251 |
| 7,876,819 B2 | 1/2011 | Wang et al. | |
| 2001/0043641 A1 | 11/2001 | Harms et al. | |
| 2005/0036548 A1 * | 2/2005 | He et al. | 375/240.12 |
| 2005/0169369 A1 | 8/2005 | Lee | |
| 2006/0135145 A1 | 6/2006 | Redi | |
| 2006/0168612 A1 | 7/2006 | Chapman et al. | |

FOREIGN PATENT DOCUMENTS

| | | |
|---|---|---|
| EP | 1549074 A1 | 6/2005 |
| JP | 2003017648 A | 1/2003 |
| JP | 2003018593 A | 1/2003 |
| WO | WO0018131 A1 | 3/2000 |
| WO | WO2005057906 | 6/2005 |

OTHER PUBLICATIONS

Cai, et al., "Optimal Bit Allocation for Low Bit Rate Video Streaming Allications", Proceedingsof the 2002 International Conference on Image Processing, pp. 73-76, vol. 1, Sep. 2002.

(Continued)

*Primary Examiner* — Twyler Haskins
*Assistant Examiner* — Lennin Rodriguez
(74) *Attorney, Agent, or Firm* — Timothy F. Loomis; Brent A. Boyd

(57) ABSTRACT

This disclosure describes rate control techniques that can improve video coding based on a "two-pass" approach. The first pass codes a video sequence using a first set of quantization parameters (QPs) for the purpose of estimating rate-distortion characteristics of the video sequence based on the statistic of the first pass. A second set of QPs can then be defined for a second coding pass. The estimated rate-distortion characteristics of the first pass are used to select Qps for the second pass in a manner that minimizes quality fluctuation between the frames of the video sequence. Furthermore, selection of the second set of QPs may also substantially maximize quality of the frames at the substantially minimized quality flucuation in order to achieve low average frame distortion with the minimized quality fluctuation.

41 Claims, 26 Drawing Sheets

OTHER PUBLICATIONS

G. M. Schuster and A. K. Katsaggelos, Rate-Distortion based video compression: optimal video frame compression and object boundary encoding, Kluwer Academic Publishers, 1997.

H. Song and C.—C. J. Kuo, "Rate control for low-bit-rate video via variable-encoding frame rates", IEEE Trans. Circuits and Systems for Video Technology, vol. 11, No. 4, pp. 512-521, Apr. 2001.

International Search Report and Written Opinion—PCT/US2006/036939, International Search Authority—European Patent Office—Mar. 11, 2009.

J. Cai, Z. He, and C. W. Chen, "A novel frame-level bit allocation based on two-pass video encoding for low bit rate video streaming applications", Journal of Visual Communication and Image Representation, to appear.

Jiansong Wang et al: "Dynamic Rate Scaling of Coded Digital Video for IVOD Applications" 1998 IEEE, vol. 44, No. 3, Aug. 1998, pp. 743-749, XP011 083669; D2: US 2003/103676 A1 (Kuniba Hideyasu [JP]) Jun. 5, 2003.

K. Ramchandran, A. Ortega, and M. Vetterli, "Bit allocation for dependent quantization with applications to multiresolution and MPEG video coders", IEEE Trans. Image Processing, pp. 533-545, Sep. 1994.

L. Lin, A. Ortega, and C.—C. J. Kuo, "A gradient-based rate control algorithm with applications to MPEG", in Proc. IEEE International Conference on Image Processing, pp. 392-395, Oct. 1995.

L. Lin, and A. Ortega, "Bit-rate control using piecewise approximated rate-distortion characteristics", IEEE Trans. Circuits and Systems for Video Technology, vol. 8, No. 4, pp. 446-459, Aug. 1998.

Y. Sermadevi and S. S. Hemami, "Efficient bit allocation for dependent video coding", in Proc. IEEE Data Compression Conference, Snowbird, UT, pp. 232-241, Mar. 2004.

Y. Sermadevi, J. Chen, S. S. Hemami, and T. Berger, "When is bit allocation for predictive video coding easy", in Proc. IEEE Data Compression Conference, Snowbird, UT, Mar. 2005.

Z. He, Y. Kim, and S. K. Mitre, "Low-delay rate control for DCT video coding via p-domain source modeling", IEEE Trans. Circuits and Systems for Video Technology, pp. 928-940, Aug. 2001.

Translation of Office Action in Japanese application 2008-532399 corresponding to U.S. Appl. No. 11/303,617, citing Jiansong_Wang_Dynamic_Rate_pp. 743_749_year_1998 and JP2003017 648 dated Dec. 7, 2010.

Zhihai He et al: "A Unified Rate-Distortion Analysis Framework for Transform Coding", IEEE Transactions on Circuits and Systems for Video Technology, IEEE Service Center, Piscataway, NJ, US, vol. 11, No. 12, Dec. 1, 2001, pp. 1222-1236, XP011014261, ISSN: 1051-8215.

* cited by examiner

TWO PASS RATE CONTROL TECHNIQUES FOR VIDEO CODING USING A MIN-MAX APPROACH

This application claims priority to pending Provisional application number 60/719,775, filed on Sep. 22, 2005.

TECHNICAL FIELD

This disclosure relates to digital video processing and, more particularly, rate controlled coding of video sequences.

BACKGROUND

Digital video capabilities can be incorporated into a wide range of devices, including digital televisions, digital direct broadcast systems, wireless communication devices, personal digital assistants (PDAs), laptop computers, desktop computers, digital cameras, digital recording devices, cellular or satellite radio telephones, and the like. Digital video devices can provide significant improvements over conventional analog video systems in creating, modifying, transmitting, storing, recording and playing full motion video sequences.

A number of different video coding standards have been established for coding digital video sequences. The Moving Picture Experts Group (MPEG), for example, has developed a number of standards including MPEG-1, MPEG-2 and MPEG-4. Other standards include the International Telecommunication Union (ITU) H.263 standard, QuickTime™ technology developed by Apple Computer of Cupertino Calif., Video for Windows™ developed by Microsoft Corporation of Redmond, Washington, Indeo™ developed by Intel Corporation, RealVideo™ from RealNetworks, Inc. of Seattle, Wash., and Cinepak™ developed by SuperMac, Inc. Furthermore, new standards continue to emerge and evolve, including the ITU H.264 standard and a number of proprietary standards.

Many video coding standards allow for improved transmission rates of video sequences by coding data in a compressed fashion. Compression can reduce the overall amount of data that needs to be transmitted for effective transmission of video frames. Most video coding standards, for example, utilize graphics and video compression techniques designed to facilitate video and image transmission over a narrower bandwidth than can be achieved without the compression. The MPEG standards and the ITU H.263 and ITU H.264 standards, for example, support video coding techniques that utilize similarities between successive video frames, referred to as temporal or inter-frame correlation, to provide inter-frame compression. Such inter-frame compression is typically achieved via motion estimation and motion compensation coding techniques. In addition, some video coding techniques may utilize similarities within frames, referred to as spatial or intra-frame correlation, to compress the video frames.

A number of rate control techniques have been developed for video coding. Rate control techniques are particularly important in order to facilitate real-time transmission of video sequences, but may also be used in non-real-time coding settings. For rate control, the coding techniques may dynamically adjust the number of bits that are coded per frame. In particular, rate control can restrict the number of bits that are coded per frame in order to ensure that the video sequence can be effectively coded at a given rate and therefore, transmitted over an allocated bandwidth. If the coding techniques are not responsive to scene changes of a video sequence, the bit rate for real-time transmission of the video sequence can vary significantly as the scenes change. Also, for some applications (such as wireless video telephony) bandwidth availability may change while a video sequence is being coded. For these or other reasons, rate control techniques can be used to dynamically adjust the number of bits used per frame during the coding.

SUMMARY

This disclosure describes rate control techniques that can improve video coding. In particular, this disclosure describes a number of rate control techniques that are based on "two-pass" coding, although additional passes could also be used. The first pass codes a video sequence using a first set of quantization parameters (QPs) for the purpose of estimating rate-distortion characteristics of the video sequence based on the statistics of the first pass. A second set of QPs can then be defined for a second coding pass. Since the first coding pass provides an estimation of the rate-distortion characteristics of the video sequence, the selection of QPs for the second pass can be improved by accounting for inter-frame dependencies.

A variety of embodiments and variations are described herein. However, two basic alternatives, consistent with this disclosure, are generally proposed. In the first case, the estimated rate-distortion characteristics of the first pass are used to select QPs for the second pass in a manner that minimizes distortion of the frames of the video sequence. In the second case, the estimated rate-distortion characteristics of the first pass are used to select QPs for the second pass in a manner that minimizes quality fluctuation between the frames of the video sequence, and may also maximize quality at the minimized quality fluctuation in order to achieve low average frame distortion.

In one embodiment, this disclosure provides a video coding device comprising means for coding frames of a video sequence using a set of first quantization parameters (QPs) in a first coding pass, means for obtaining rate-distortion statistics for the coded video sequence of the first coding pass, means for estimating rate-distortion characteristics of the video sequence based on the rate-distortion statistics, and means for selecting a second set of QPs for a second coding pass of the frames in the video sequence based on the estimated rate-distortion characteristics.

In another embodiment, this disclosure provides a video coding device comprising means for coding frames of the video sequence using a set of first quantization parameters (QPs) a first coding pass, means for obtaining rate-distortion statistics for the coded video sequence, means for estimating rate-distortion characteristics of the video sequence based on the rate-distortion statistics, and means for substantially minimizing quality fluctuation between the frames of the video sequence in a second coding pass using the estimated rate-distortion characteristics to select a second set of QPs for the second coding pass of the frames in the video sequence.

The rate controlled coding techniques described herein may be implemented in a video coding device in hardware, software, firmware, or any combination thereof. If implemented in software, the software may be executed in a processor, such as a programmable processor used for video coding. The software that executes the techniques may be initially stored in a computer readable medium and may be loaded and executed in the processor in order to perform such rate controlled video coding.

Additional details of various embodiments are set forth in the accompanying drawings and the description below. Other

DETAILED DESCRIPTION

Figure 1:
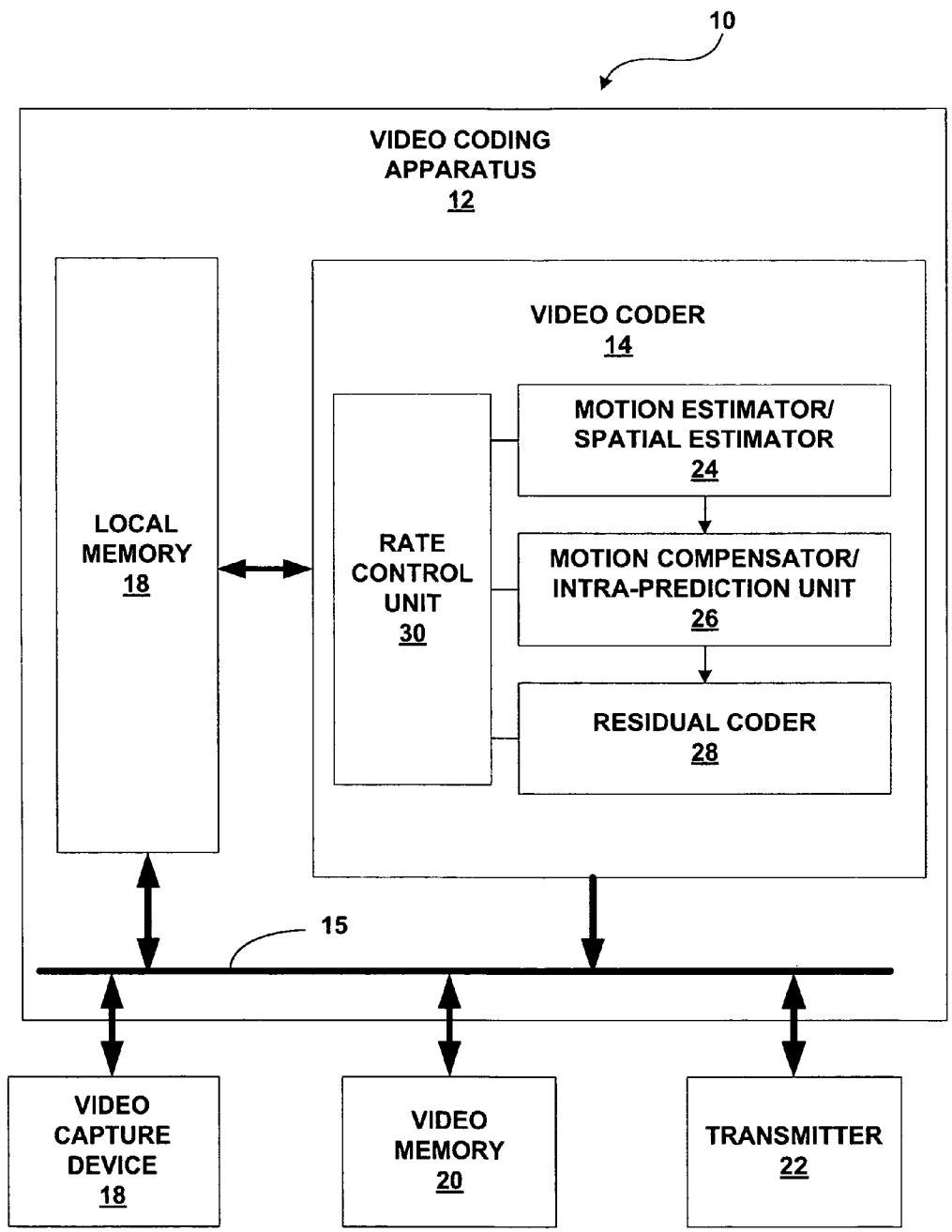
FIG. 1 is a block diagram illustrating an exemplary video coding device according to this disclosure.

This disclosure describes rate control techniques for video coding. The described techniques are based on a "two-pass" approach in which a first coding pass is used to estimate characteristics of the video sequence, and the estimated characteristics are then used to improve upon the selection of quantization parameters (QPs) for the second pass. This disclosure can take advantage of certain characteristics of frame dependency of rate-distortion characteristics of a video sequence. In particular, this disclosure observes that in many cases (specifically in the cases studied herein) rate and distortion of a current frame are highly dependent upon the QP used in the immediately preceding frame, but that the QPs used for frames before the immediately preceding frame have very little impact on the rate and distortion of a current frame. Using these observations, a significant reduction in computation intensity can be achieved in a coding device by essentially simplifying rate and distortion models to approximations.

The first coding pass codes a video sequence using a first set of QPs for the purpose of estimating rate-distortion characteristics of the video sequence based on the statistics of the first pass. The first set of QPs may be selected in any fashion, such as by assigning the same QP to every frame, or by using a so called "greedy" algorithm that uses a rate budget to determine a QP and then re-allocates the rate budget over the remaining frames to define each subsequent QP. Regardless of how the first set of QPs are selected or determined for the first coding pass, the rate-distortion statistics for the video sequence can be obtained by the first coding pass.

After the first coding pass, rate-distortion characteristics of the video sequence can be estimated based on the rate-distortion statistics. The manner in which the rate-distortion characteristics are estimated may vary in different embodiments, but generally comprise the application of rate and distortion models to the rate-distortion statistics obtained in the first coding pass. After the rate-distortion characteristics are estimated, these characteristics are used to select a second set of QPs for a second coding pass of the frames in the video sequence. The second coding pass, then, can be used to ultimately code the video sequence, and the QPs selected for the second coding pass can achieve video quality improvements in such coding.

A variety of embodiments and variations are described herein. However, two basic alternatives, consistent with this disclosure, are generally proposed. In the first case, the estimated rate-distortion characteristics of the first pass are used to select QPs for the second pass in a manner that minimizes distortion of the frames of the video sequence. In the second case, the estimated rate-distortion characteristics of the first pass are used to select QPs for the second pass in a manner that minimizes quality fluctuation between the frames of the video sequence. While distortion minimization can result in the better overall coding on average, minimization of quality fluctuation can reduce or eliminate undesirable flickering problems due to abrupt quality changes. Combinations of these two cases are also contemplated by this disclosure.

FIG. 1 is a block diagram illustrating an exemplary video coding device 10. Video coding device 10 may form part of a digital video device capable of coding and transmitting video data. The video data may be captured from a video camera, retrieved from a video archive, or obtained in another manner. Coding device 10 may be implemented in devices such as digital televisions, digital direct broadcast systems, wireless communication devices, personal digital assistants (PDAs), laptop computers, desktop computers, digital cameras, digital recording devices, cellular or satellite radio telephones, or any telecommunication device with video telephony (VT) capabilities. Coding device 10 may comply with a video coding standard such as MPEG-4, ITU-T H.263, ITU-T H.264, or another video coding standard that requires QP selection for quantized video coding. Coding device 10 may support inter-frame coding techniques such as motion estimation and motion compensation, and may also support other techniques, such as spatial estimation and intra-prediction coding techniques used for intra-frame coding.

As shown in FIG. 1, coding device 10 includes a video coding apparatus 12 to code video sequences, and a video memory 20 to store the video sequences before and after such coding. Device 10 may also include a transmitter 22 to transmit the coded sequences to another device, and possibly a video capture device 18, such as a video camera, to capture video sequences and store the captured sequences in memory 20. The various elements of coding device 10 may be communicatively coupled via a communication bus 15. Various other elements, such as various filters, or other elements may also be included in coding device 10, but are not specifically illustrated for simplicity. The architecture illustrated in FIG. 1 is merely exemplary, as the techniques described herein may be implemented with a variety of other architectures.

Video memory 20 typically comprises a relatively large memory space. Video memory 20, for example, may comprise dynamic random access memory (DRAM), or FLASH memory. In other examples, video memory 20 may comprise a non-volatile memory or any other data storage device.

Video coding apparatus 12 may comprise a so called "chip set" for a mobile radiotelephone, including a combination of hardware, software, firmware, and/or one or more microprocessors, digital signal processors (DSPs), application specific integrated circuits (ASICs), field programmable gate arrays (FPGAs), or various combinations thereof. Video coding apparatus 12 generally includes a video coder 14 coupled to a local memory 18. Video coder 14 may comprise an encoder/decoder (CODEC) for encoding and decoding digital video data. Local memory 18 may comprise a smaller and faster memory space relative to video memory 20. By way of example, local memory 18 may comprise synchronous dynamic random access memory (SDRAM). Local memory 18 may comprise "on-chip" memory integrated with the other components of video coding apparatus 12 to provide for very fast access to data during the processor-intensive coding process. However, memories 20 and 18 may be combined into the same memory part, or may be implemented in a number of other configurations.

As described herein, video coder 14 implements a "two-pass" coding approach in which a first coding pass is used to estimate characteristics of the video sequence and the second coding pass uses the estimated characteristics to improve upon selection of QPs used in the second pass in order to improve quality of the coding. Rate control unit 30 handles the QP selection process, which uses the estimated characteristics in the first coding pass. The techniques implemented by rate control unit 30 can take advantage of frame dependency by estimating rate-distortion characteristics of a video sequence in order to achieve a significant reduction in computation intensity by essentially simplifying rate and distortion models to approximations.

Rate control unit 30 applies a first set of QPs in the first coding pass for the purpose of estimating rate-distortion characteristics of the video sequence based on the statistics of the first pass. After the first coding pass, rate control unit 30 estimates rate-distortion characteristics of the video sequence based on the rate-distortion statistics. Then, rate control unit 30 uses these estimated rate-distortion characteristics to select a second set of QPs for a second coding pass of the frames in the video sequence. The second coding pass, then, can be used to ultimately code the video sequence, and the QPs selected for the second coding pass can achieve video quality improvements in such coding. In accordance with this disclosure, the estimated characteristics can quantify frame dependencies in a manner that allows for improved QP selection in the second pass.

For each coding pass, during the coding of a given video frame, the current video block to be coded may be loaded from video memory 20 to local memory 18. A search space used in locating prediction video blocks may also be loaded from video memory 20 to local memory 18. The search space may comprise a subset of pixels of one or more of the preceding video frames (or subsequent frames). The chosen subset may be pre-identified as a likely location for identification of a prediction video block that closely matches the current video block to be coded.

Local memory 18 is loaded with a current video block to be coded and a search space. Motion estimator/spatial estimator 24 compares the current video block to various video blocks in the search space in order to identify a prediction video block. Motion estimator/spatial estimator 24 generally represents a motion estimator that performs motion estimation for inter-frame coding, a spatial estimator that performs spatial estimation for intra-frame coding, or a combined unit that can perform motion estimation and spatial estimation. In general, the prediction video block is a candidate video block found to provide an adequate match with the current video block for purposes of inter-frame correlation (or intra-frame correlation), which may be the most closely matching candidate video block. The prediction video block is one of many candidate video blocks evaluated during the motion estimation process to identify a video block having a minimum difference value relative to the current video block.

In order to perform the comparisons between the current video block to be coded and the candidate video blocks in the search space of memory 18, motion estimator/spatial estimator 24 may perform sum of absolute difference (SAD) techniques, sum of squared difference (SSD) techniques, or other comparison techniques. In this manner, motion estimator/spatial estimator 24 can determine the difference values for the different candidate video blocks. A lower difference value generally indicates that a candidate video block is a better match, and thus a better candidate for use in motion estimation coding than other candidate video blocks yielding higher difference values. A prediction video block may be identified once a suitable match is found.

Once a prediction video block is identified by motion estimator/spatial estimator 24 for a video block to be coded, motion compensator/intra-prediction unit 26 creates a residual. The residual is a block of data indicative of differences between the current video block to be coded and the prediction video block identified by motion estimation or spatial estimation. Motion compensator/intra-prediction unit 26 generally represents a motion compensator that performs motion compensation for inter-frame coding, an intra-prediction unit that performs spatial compensation for intra-frame coding, or a combined unit that can perform either motion compensation and intra-prediction depending upon whether inter-frame or intra-frame coding is being used. Motion compensator/intra-prediction unit 26 may fetch the prediction block using a motion vector, and then subtract the prediction block from an input block to generate the residual. The residual typically includes substantially less data than the original video block that is represented by the difference block.

After motion compensator/intra-prediction unit 26 has created the residual, residual coder 28 may perform one or more residual coding steps, such as discrete cosine transformation (DCT), zig-zag scanning, run length coding, variable length (Huffman) coding, or any other process used in a given coding standard. Numerous other residual coding steps may also be performed.

Rate control unit 30 may implement one of two alternatives, consistent with this disclosure. In the first case, rate control unit 30 uses the estimated rate-distortion characteristics of the first pass to select QPs for the second pass in a manner that minimizes distortion across all frames of a video sequence. In the second case, rate control unit 30 uses the estimated rate-distortion characteristics of the first pass to select QPs for the second pass in a manner that minimizes quality fluctuation of the frames of the sequence. While distortion minimization can result in better overall coding on average, minimization of quality fluctuation may be desired to reduce or eliminate flickering problems due to abrupt quality changes. Details of each of these two alternatives is set forth in greater detail below.

The discussion of FIGS. 2-15 generally outlines the first approach in which the goal is to substantially minimize distortion of a coded video sequence, whereas FIGS. 16-26 generally outline the second approach in which the goal is to substantially minimize quality fluctuation of coded the video sequence. Any details discussed with respect to any of FIGS. 2-26, however, should not be construed as being limited to either approach, as one or more aspects of each approach could also be used in combination according to this disclosure. In the various experiments graphs of test sequences discussed herein, the test sequences are generally Quarter Common Image Format (QCIF) sequences commonly used in video coding to test and compare coding quality.

Figure 2:
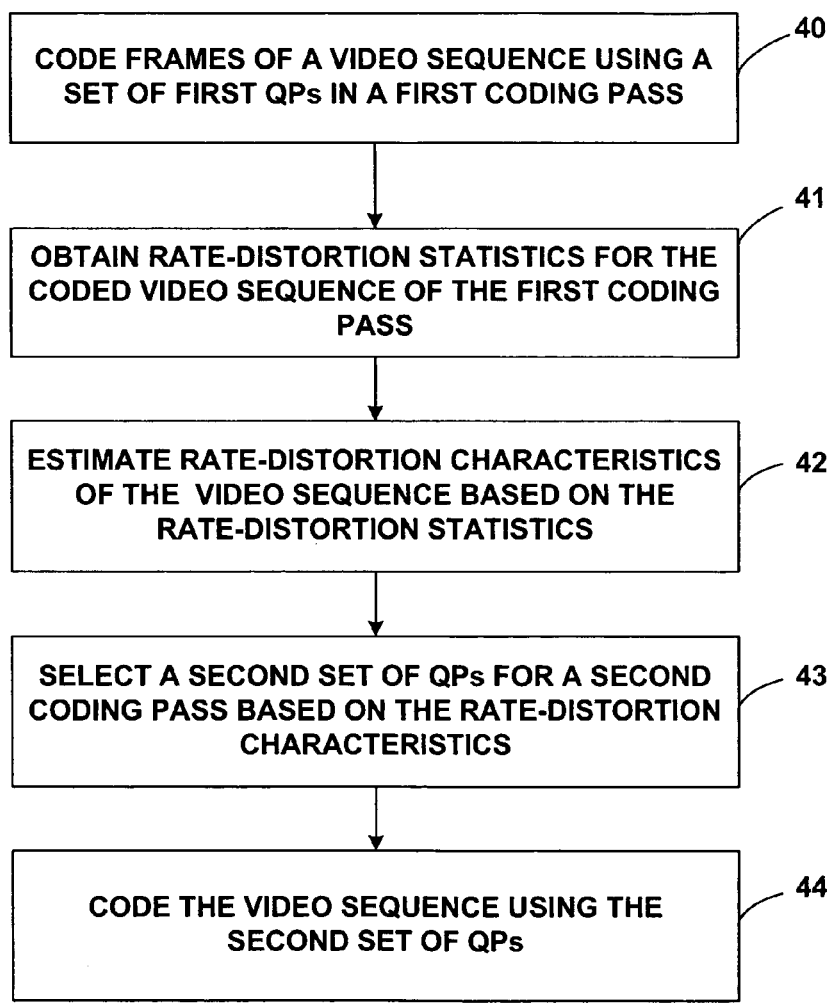
FIG. 2 is a flow diagram illustrating a two-pass rate controlled video coding technique according to an embodiment of this disclosure in which rate-distortion characteristics are estimated and used to define quantization parameters for a video sequence.

FIG. 2 is a flow diagram illustrating a technique for rate controlled video coding according to this disclosure. As shown in FIG. 2, video coder 14 codes the frames of a video sequence using a first set of QPs (40). Rate control unit 30 then obtains rate-distortion statistics for the coded video sequence of the first coding pass (41). The various other units 24, 26 and 28 of video coder 14 may be implemented in the first coding pass using the set of first QPs identified by rate control unit 30. The first set of QPs may be selected in a variety of different ways, or according to any rate control algorithm. In one example, the first set of QPs are dynamically selected by rate control unit 30 based on a so called "greedy" algorithm that selects a QP for a frame based on a rate budget relative to the number of frames in the sequence, but then reallocates the remaining rate budget over the remaining frames. In another example, the same QP may be pre-selected and used for all frames in the first pass, in which case, the QPs in the first set of QPs are identical to one another.

After the first coding pass, rate control unit 30 estimates rate-distortion characteristics of the video sequence based on the rate-distortion statistics obtained by the first coding pass (42). In general, the process of estimating the rate-distortion characteristics comprises applying a rate model and a distortion model to the rate-distortion statistics. Exemplary mathematical models are described in greater detail below, which can reduce computation complexity to approximations, yet provide very good estimations and good coding results. Again, the estimated characteristics can quantify frame dependencies in a manner that allows for improved QP selection in the second pass.

Rate control unit 30 then selects a second set of QPs for a second coding pass based on the rate distortion characteristics (43). The second set of QPs are different than the first set of QPs and are selected in order to improve the quality of the coding. The first coding pass may be a lower quality coding pass, but provides the information needed to apply accurate modeling, and account for inter-frame dependencies in the coding of the video sequence. In one example, rate control unit 30 selects the second set of QPs by performing a Lagrangian relaxation operation on the estimated rate-distortion characteristics, as discussed in further detail below. In this case or similar cases, the selection of the second set of QPs may involve substantially minimizing distortion of the frames in the video sequence. In any case, once rate control unit 30 has selected the second set of QPs, video coder 14 codes the video sequence using the second set of QPs (44).

In video coding, a fuindamental problem is to efficiently allocate bits among the frames or choose a QP for each frame to achieve the best overall quality of the video sequence. The difficulty of this problem is mainly due to the coding dependencies of the frames and the consequent cost for searching a candidate space containing exponential number of nodes. In one embodiment of this disclosure, a solution is proposed that uses a set of estimation models to approximate the practical rate and distortion status in the second-pass coding. The models are based on the observation that in many cases the rate and distortion of current frame are highly dependent on the quantization level of its preceding frame, and that the QP selection of the previous frames earlier than the last one has very little impact on the performance of the current frame. The models and observations enable the significant reduction of the candidate space of the problem. Furthermore, by using Lagrangian relaxation and dynamic programming, a constrained problem can be converted into an unconstrained problem and solved by using a shortest path search algorithm. Experimental results have shown significant gains of up to 1.7 dB compared to the "greedy" frame-level rate control algorithm used in some conventional CODECs.

Many conventional rate control schemes are designed for real-time coding applications and adopt a greedy frame-level bit allocation strategy. The greedy frame-level bit allocation strategy assumes that future frames should have uniformly distributed texture complexity. Therefore, the greedy frame-level bit allocation strategy allocates remaining bits equally among the future frames.

Unfortunately, it is not a trivial task to obtain good frame bit allocation because the rate-distortion (R-D) function of a frame depends on the quantization parameter (QP) choices for the prior coded frames. In other words, generation of the global rate-distortion function for the whole video sequence is very difficult due to the frame dependencies.

This disclosure proposes a frame-level rate control algorithm based on an accurate rate and distortion estimation model. It has been observed that the frame distortion highly depends on level of quantization of the preceding frame. In addition, the distortion during the second pass coding can be approximated by statistics such as a function of the distortion in the first pass (using the same level of quantization), the energy of the motion-compensated residue in the first pass, and the distortion of the preceding frame in the first pass. It has also been observed that the quantization selection of the frames earlier than the immediately preceding frame has very little impact on the frame distortion of the current frame. With the above observations and the estimated $\rho$-QP and D-QP tables for each frame (which can be stored in memory 18), Lagrangian relaxation techniques can be used to find a desirable QP selection for each frame. The value $\rho$ represents the number of non-zero quantized DCT coefficients in the frame, QP represents the quantization parameter, and D represents distortion.

In accordance with one embodiment, the problem can be defined as choosing the QP for each frame in an effort to achieve the best overall quality of the video sequence, based on the statistics collected during the first-pass coding. Although the problem of how to do the first-pass coding is relevant, to simplify the problem, one may assume that a "greedy" frame-level bit allocation algorithm is used to code the frame at the first pass. Of course, other first pass coding techniques could also be used in accordance with the two-pass techniques of this disclosure. In the following, the frame bit rate is modeled as a function of $\rho$, which is the number of non-zero quantized DCT coefficients in the frame. Then the bit rate can be represented by:

$$R = A\rho + B \quad \text{(Equation 1)}$$

where A and B are constant modeling parameters. A can represent the average number of bits needed to code a non-zero quantized DCT coefficients and B can represent the bits used for non-texture information, such as prediction modes and motion vectors.

Let N denote the number of total frames in the processed video sequence. $\{\hat{Q}_i\}$ denotes the QP. $\{\hat{A}_i\}$ denotes the average number of bits per non-zero quantized DCT coefficients. $\{\hat{B}_i\}$ denotes the number of bits for coding non-texture information. $\{\hat{\rho}_i\}$ denotes the number of non-zero quantized DCT coefficients. $\{\hat{\sigma}_i^2\}$ denotes the energy of the motion-compensated residue. $\{\hat{D}_i\}$ denotes the distortion of the ith frame resulted in the first pass coding, and (i=1, 2, ..., N) identifies the frame of a sequence. The variables identified by a "^" are variables estimated by the first coding pass. Variables without the identifier "^" are generally similarly named second pass variables, e.g., either approximations or second pass variables to be solved.

Let $R_{budget}$ denote the total bit budget for the video sequence, and $\{Q_i\}$, $\{R_i\}$ and $\{D_i\}$ the QP, bit rate, and distortion of the ith frame in the second-pass coding. Therefore the problem can be represented by $$\underset{\{Q_i\}}{\text{Minimize}} \sum_{i=1}^{N} D_i, \text{ such that } \sum_{i=1}^{N} R_i \leq R_{budget}. \quad \text{(Equation 2)}$$

Both $R_i$ and $D_i$ are functions of $Q_1, Q_2, \ldots, Q_i$, due to the fact that predictive coding is used. In addition, $R_i(\hat{Q}_1, \hat{Q}_2, \ldots, \hat{Q}_i) = \hat{A}_i \hat{\rho}_i + \hat{B}_i$, and $D_i(\hat{Q}_1, \hat{Q}_2, \ldots, \hat{Q}_i) = \hat{D}_i$ (i=1, \ldots, N).

The frame dependencies can be significantly simplified based on an observation that the QP selection of the preceding frame has the major impact on the rate-distortion performance of the current frame. In other words, the i-tuple fuinctions $R_i(Q_1, Q_2, \ldots, Q_i)$ and $D_i(Q_1, Q_2, \ldots, Q_i)$ can be reduced to 2-tuple functions $R_i(Q_{i-1}, Q_i)$ and $D_i(Q_{i-1}, Q_i)$ because the selections of $Q_1, Q_2, \ldots, Q_{i-2}$ will not cause significant changes on the rate and distortion for the ith frame. This observation has been verified on a sequence referred to as "the football QCIF video sequence," as shown in FIGS. 3-6.

Figure 3:
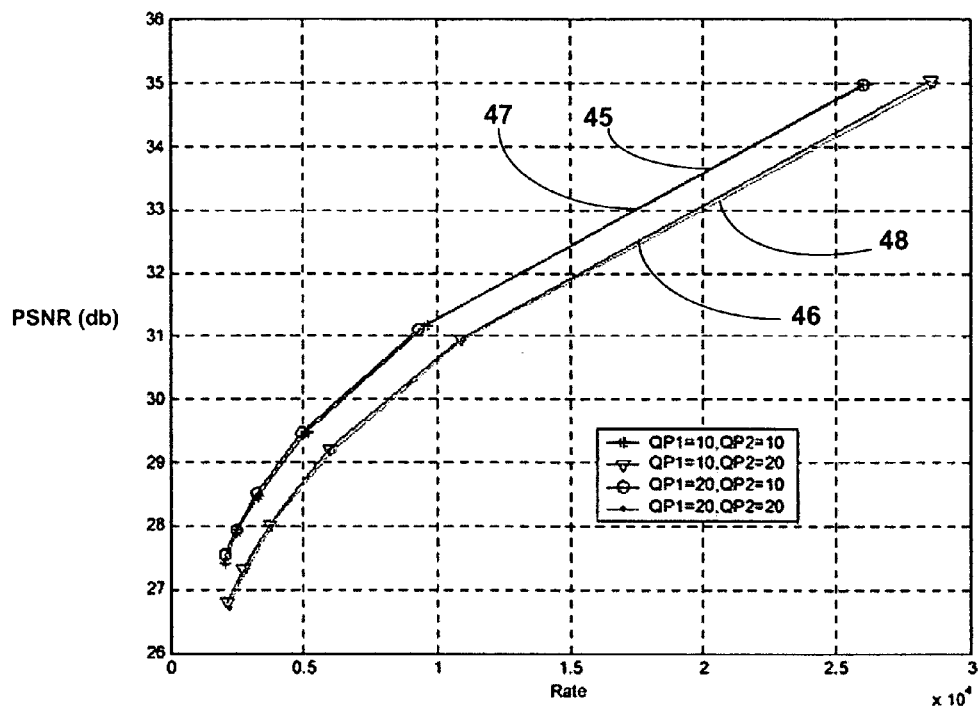
FIGS. 3-15 are various graphs of data illustrating aspects of the techniques of this disclosure.
Figure 4:
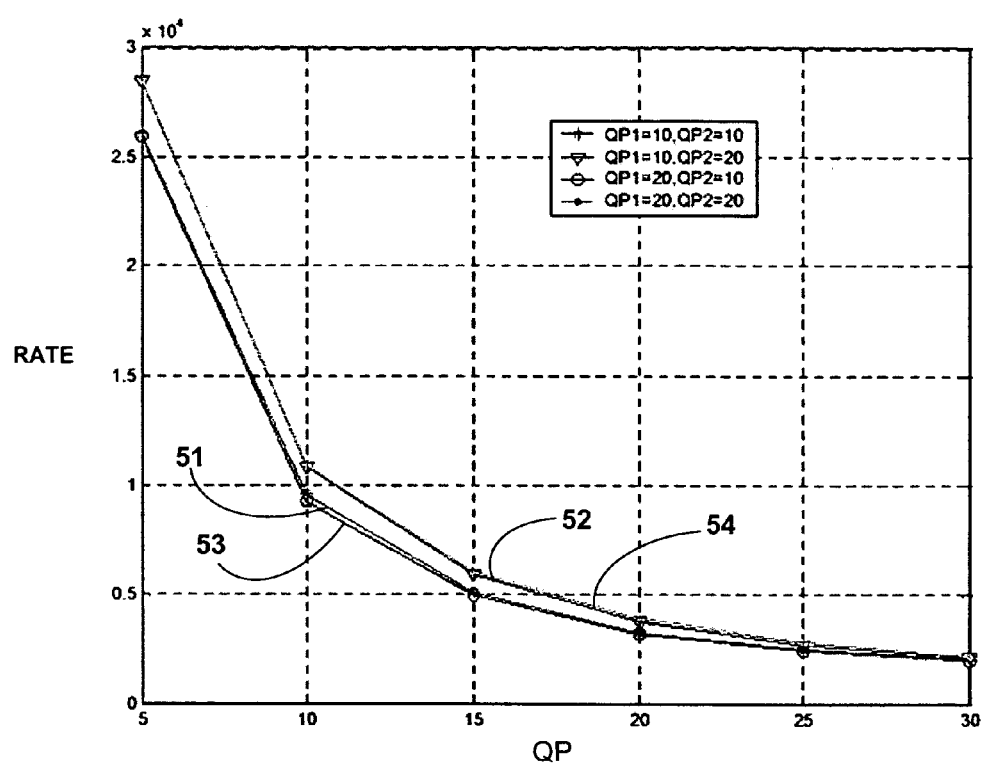
Figure 5:
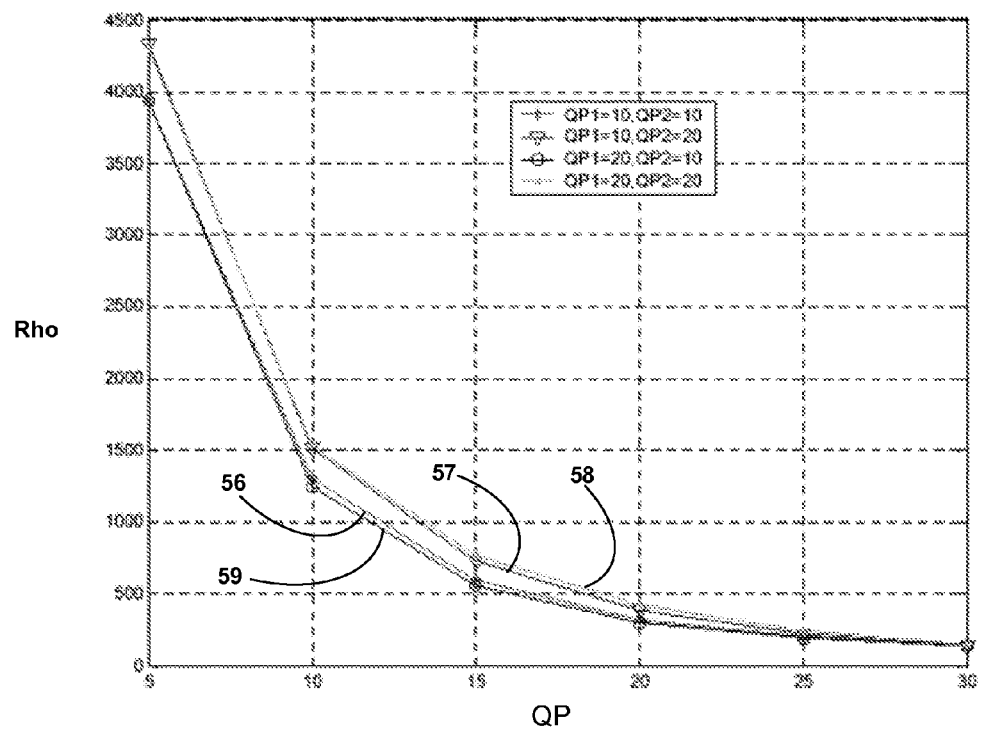
Figure 6:
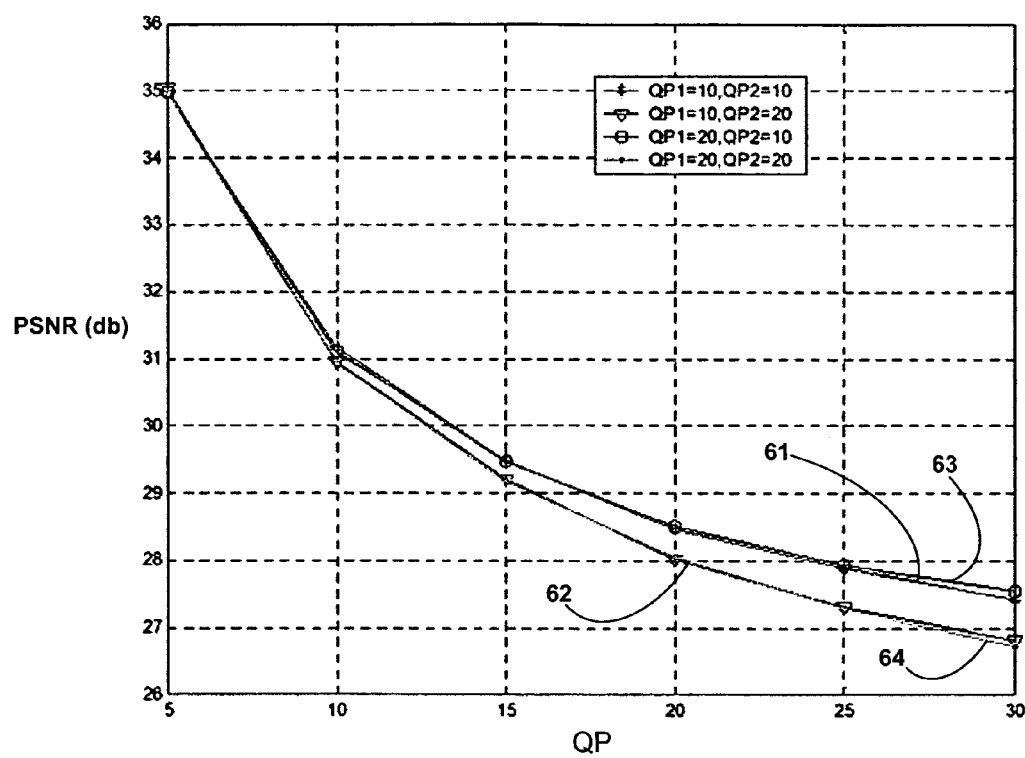

In particular, FIG. 3 plots experimental results of the rate-distortion curves for the fourth frame of a sequence using ($QP_1=10$, $QP_2=10$) labeled 45, ($QP_1=10$, $QP_2=20$) labeled 46, ($QP_1=20$, $QP_2=10$) labeled 47, and ($QP_1=20$, $QP_2=20$) labeled 48. FIG. 4 plots experimental results of the rate-QP curves for the fourth frame of the sequence using ($QP_1=10$, $QP_2=10$) labeled 51, ($QP_1=10$, $QP_2=20$) labeled 52, ($QP_1=20$, $QP_2=10$) labeled 53, and ($QP_1=20$, $QP_2=20$) labeled 54. FIG. 5 plots experimental results of the rho-QP curves for the fourth frame of the sequence using ($QP_1=10$, $QP_2=10$) labeled 56, ($QP_1=10$, $QP_2=20$) labeled 57, ($QP_1=20$, $QP_2=10$) labeled 58, and ($QP_1=20$, $QP_2=20$) labeled 59. FIG. 6 plots experimental results of the distortion-QP curves of the fourth frame of the sequence using ($QP_1=10$, $QP_2=10$) labeled 61, ($QP_1=10$, $QP_2=20$) labeled 62, ($QP_1=20$, $QP_2=10$) labeled 63, and ($QP_1=20$, $QP_2=20$) labeled 64.

For the experiments illustrated by the results of FIGS. 3-6, the QP of the first frame (I-frame) was set to 5, and the QP combinations (10, 10), (10, 20), (20, 10), and (20, 20) were used for the second and third frames. From FIGS. 3-6, it is shown that the selection of $QP_1$ (the QP for the second frame) has very little impact on the rate and distortion of the fourth frame, but that the selection of $QP_2$ (the QP for the third frame) directly affects the performance of the fourth frame. Therefore, one can simplify the problem by only considering the dependencies of the consecutive frames, without sacrificing any significant quality.

Hence, if one obtains the tables of $R_i(Q_{i-1}, Q_i)$ and $D_i(Q_{i-1}, Q_i)$ for all combinations of the candidates of $Q_{i-1}$ and $Q_i$, the problem of Equation 2 can be solved more easily. In the following discussion, accurate estimation models are proposed to approximate the rate and distortion functions by using the information obtained in the first pass coding. Then, the problem of Equation 2 can be solved using Lagrangian relaxation to convert the problem to an unconstrained problem. After converting the problem using Lagrangian relaxation, the unconstrained problem can be mapped into a graph theory problem and solved using a shortest path search algorithm.

For a distortion estimation model it is noted that in the first coding pass, one is able to obtain all the values of $D_i(\hat{Q}_{i-1}, q)$ for q=1, 2 . . . 31, for the ith frame. In addition, the value of $\hat{\sigma}_i^2(\hat{Q}_{i-1})$ can also be obtained. Based on the distortion model proposed by Z. He, Y. Kim, and S. K. Mitra, "Low-Delay Rate Control for DCT Video Coding via ρ-Domain Source Modeling", *IEEE Trans. Circuits and Systems for Video Technology*, pp. 928-940, August 2001, one obtains:

$$D_i(\hat{Q}_{i-1}, Q_i) = \hat{\sigma}_i^2(\hat{Q}_{i-1})e^{-\alpha_i(1-\rho_i(\hat{Q}_{i-1}, Q_i))} \quad \text{(Equation 3)}$$

and $$D_i(Q_{i-1}, Q_i) = \rho_i^2(Q_{i-1})e^{-\alpha_i(1-\rho_i(Q_{i-1}, Q_i))} \quad \text{(Equation 4)}$$

where $\alpha_i$ is a model parameter.

From FIG. 5, one can observe that the rho-QP curve is mainly driven by the QP of the current frame. In other words, $\rho_i(\hat{Q}_{i-1}, Q_i) \approx \rho_i(Q_{i-1}, Q_i)$ holds especially for the cases when $Q_i$ is assigned a large number (for example, greater than 15). The term rho refers to the term ρ as defined herein. From Equations 3 and 4, one can obtain:

$$D_i(Q_{i-1}, Q_i) \approx D_i(\hat{Q}_{i-1}, Q_i) \frac{\sigma_i^2(Q_{i-1})}{\hat{\sigma}_i^2(\hat{Q}_{i-1})}. \quad \text{(Equation 5)}$$

Figure 7:
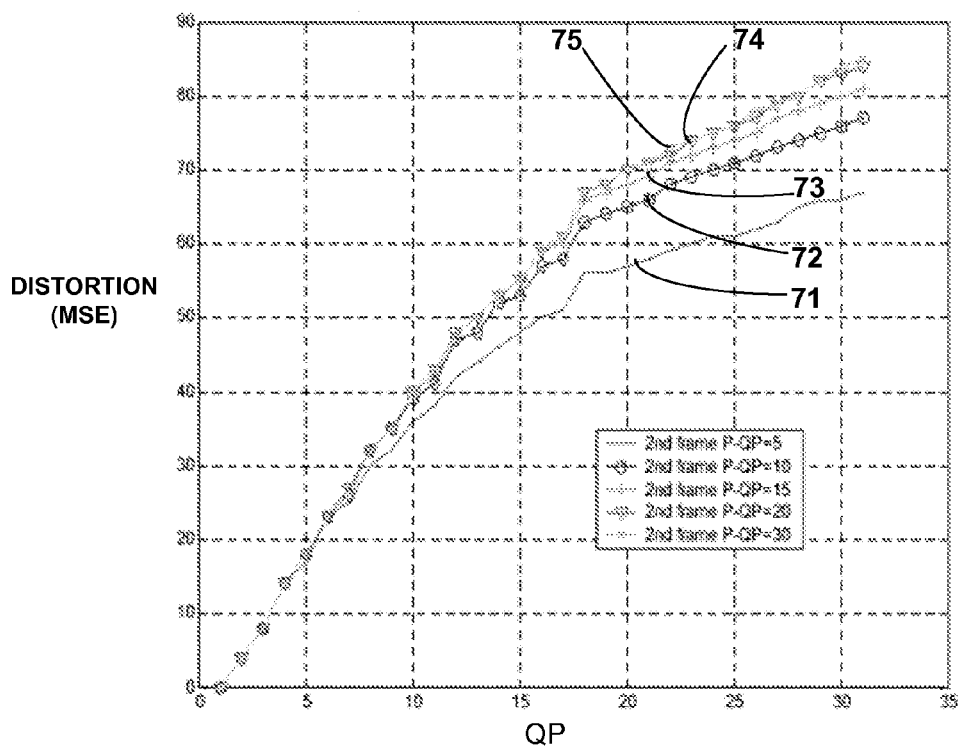
Figure 8:
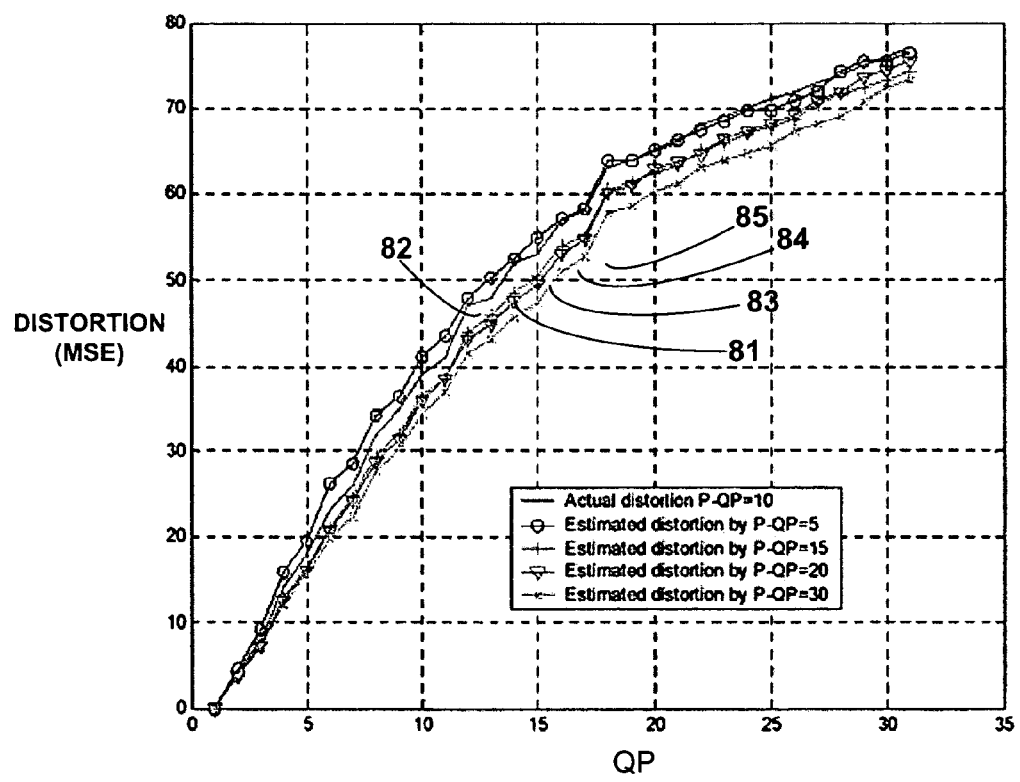

Equation 5 was experimentally verified by coding the first three frames of a sequence referred to as the "Football QCIF video sequence." The results of this experiment are illustrated in FIGS. 7 and 8. The first frame (I-frame) of the sequence was coded using QP=5, and the second frame (P-frame) was coded using QP=5, 10, 15, 20, and 30, respectively. FIG. 7 shows the D-QP curve of the $3^{rd}$ frame for each setting. In FIG. 7, the results for settings (I-frame, P-frame) are labeled as follows: (5, 5) is labeled 71, (5, 10) is labeled 72, (5, 15) is labeled 73, (5,20) is labeled 74, and (5, 30) is labeled 75.

In FIG. 8, the actual D-QP curve of the $3^{rd}$ frame generated by setting QP=10 for the second frame (P-frame) is compared with the estimated D-QP curves from the data produced by the cases that use QP=5, 15, 20 and 30 for the second frame and by using Equation 5. In FIG. 8, the results for settings (I-frame, P-frame) are labeled as follows: actual (5, 10) is labeled 81, predicted (5, 5) is labeled 82, predicted (5, 15) is labeled 83, predicted (5,20) is labeled 84, and predicted (5, 30) is labeled 85. The results indicate that Equation 5 is very accurate.

In order to estimate $\rho_i^2(Q_{i-1})$ in Equation 5, M is used to denote the total pixels in the frame, $y_k$ (k=1, . . . M) the kth original pixel in the frame, $x_k$ the kth original pixel in the preceding frame, $\hat{x}_k$ and $\check{x}_K$ the corresponding motion-compensated pixel from the preceding frame in the first and second pass coding. Here, a special case is considered in which all the video blocks (e.g., macroblocks) use zero motion vectors, which means that $\hat{x}_k$ and $\check{x}_k$ are the corresponding reconstructed pixel of the preceding frame in the first and second pass coding. In this case, $$\sigma_i^2(Q_{i-1}) = \sum_{k=1}^{M} (y_k - \check{x}_k)^2 \quad \text{(Equation 6)}$$

$$= \sum_{k=1}^{M} (y_k - x_k + x_k - \check{x}_k)^2$$

$$= \sum_{k=1}^{M} (y_k - x_k)^2 + \sum_{k=1}^{M} (x_k - \check{x}_k)^2 +$$

$$2\sum_{k=1}^{M} (y_k - x_k)(x_k - \check{x}_k)$$

-continued $$= \sum_{k=1}^{M} (y_k - x_k)^2 + D_{i-1}(Q_{i-2}, Q_{i-1}) +$$

$$2 \sum_{k=1}^{M} (y_k - x_k)(x_k - \breve{x}_k).$$

Similarly, $$\hat{\sigma}_i^2(\hat{Q}_{i-1}) = \sum_{k=1}^{M} (x_k - \hat{x}_k)^2 \quad \text{(Equation 7)}$$

$$= \sum_{k=1}^{M} (y_k - x_k)^2 + \hat{D}_{i-1}(\hat{Q}_{i-2}, \hat{Q}_{i-1}) +$$

$$2 \sum_{k=1}^{M} (y_k - x_k)(x_k - \breve{x}_k).$$

Equations 6 and 7 yield:

$$\sigma_i^2(Q_{i-1}) - \hat{\sigma}_i^2(\hat{Q}_{i-1}) = D_{i-1}(Q_{i-2}, Q_{i-1}) - \quad \text{(Equation 8)}$$

$$\hat{D}_{i-1}(\hat{Q}_{i-2}, \hat{Q}_{i-1}) +$$

$$2 \sum_{k=1}^{M} (y_k - x_k)(\hat{x}_k - \breve{x}_k)$$

$$\approx D_{i-1}(Q_{i-2}, Q_{i-1}) -$$

$$\hat{D}_{i-1}(\hat{Q}_{i-2}, \hat{Q}_{i-1}),$$

because $$E\left[\sum_{k=1}^{M} (y_k - x_k)(\hat{x}_k - \breve{x}_k)\right] = \sum_{k=1}^{M} (y_k - x_k) E[\hat{x}_k - \breve{x}_k] = 0$$

is the distribution of the image data is assumed to be a Gaussian or Lapalacian distribution.

Therefore:

$$\sigma_i^2(Q_{i-1}) \approx \quad \text{(Equation 9)}$$
$$\hat{\sigma}_i^2(\hat{Q}_{i-1}) + D_{i-1}(Q_{i-2}, Q_{i-1}) - \hat{D}_{i-1}(\hat{Q}_{i-2}, \hat{Q}_{i-1}),$$

and thus:

$$D_i(Q_{i-1}, Q_i) \approx \hat{D}_i(\hat{Q}_{i-1}, Q_i) \quad \text{(Equation 10)}$$
$$\frac{\hat{\sigma}_i^2(\hat{Q}_{i-1}) + D_{i-1}(Q_{i-2}, Q_{i-1}) - \hat{D}_{i-1}(\hat{Q}_{i-2}, \hat{Q}_{i-1})}{\hat{\sigma}_i^2(\hat{Q}_{i-1})}.$$

It can be observed from Equation 6 that the inter-frame dependency of the rate function is reasonably low, and a linear relationship exists between the variance of the motion-compensated residue and the coding error of the reference frame. However, it can be observed that the rate of current frame has certain dependencies on the QP selection of its preceding frame.

Denote $\{A_i\}$, $\{B_i\}$, $\{\rho_i\}$ as the average number of bits per non-zero quantized DCT coefficients, number of bits for coding non-texture information, and number of non-zero quantized DCT coefficients resulted in the second pass coding. Clearly, $R_i = A_i \rho_i + B_i$. In the following text these parameters are empirically modeled as:

$$\rho_i \approx \hat{\rho}_i \sqrt{\frac{\hat{\sigma}_i^2(\hat{Q}_{i-1}) + D_{i-1}(Q_{i-2}, Q_{i-1}) - \hat{D}_{i-1}(\hat{Q}_{i-2}, \hat{Q}_{i-1})}{\hat{\sigma}_i^2(\hat{Q}_{i-1})}}, \quad \text{(Equation 11)}$$

$$B_i \approx \hat{B}_i \sqrt{\frac{\hat{\sigma}_i^2(\hat{Q}_{i-1}) + D_{i-1}(Q_{i-2}, Q_{i-1}) - \hat{D}_{i-1}(\hat{Q}_{i-2}, \hat{Q}_{i-1})}{\hat{\sigma}_i^2(\hat{Q}_{i-1})}} \left[\frac{\hat{\rho}_i(\hat{Q}_i)}{\hat{\rho}_i(\hat{Q}_i)}\right]^{\frac{1}{8}}, \quad \text{(Equation 12)}$$

and $$A_i \approx \begin{cases} \hat{A}_i & \text{if } \hat{\rho}_i > \frac{M}{256} \\ \frac{256 * \hat{A}_i \hat{\rho}_i}{M} & \text{if } \frac{M}{512} < \hat{\rho}_i < \frac{M}{256} \\ \frac{128 * \hat{A}_i \hat{\rho}_i}{M} & \text{otherwise} \end{cases} \quad \text{(Equation 13)}$$

Figure 9:
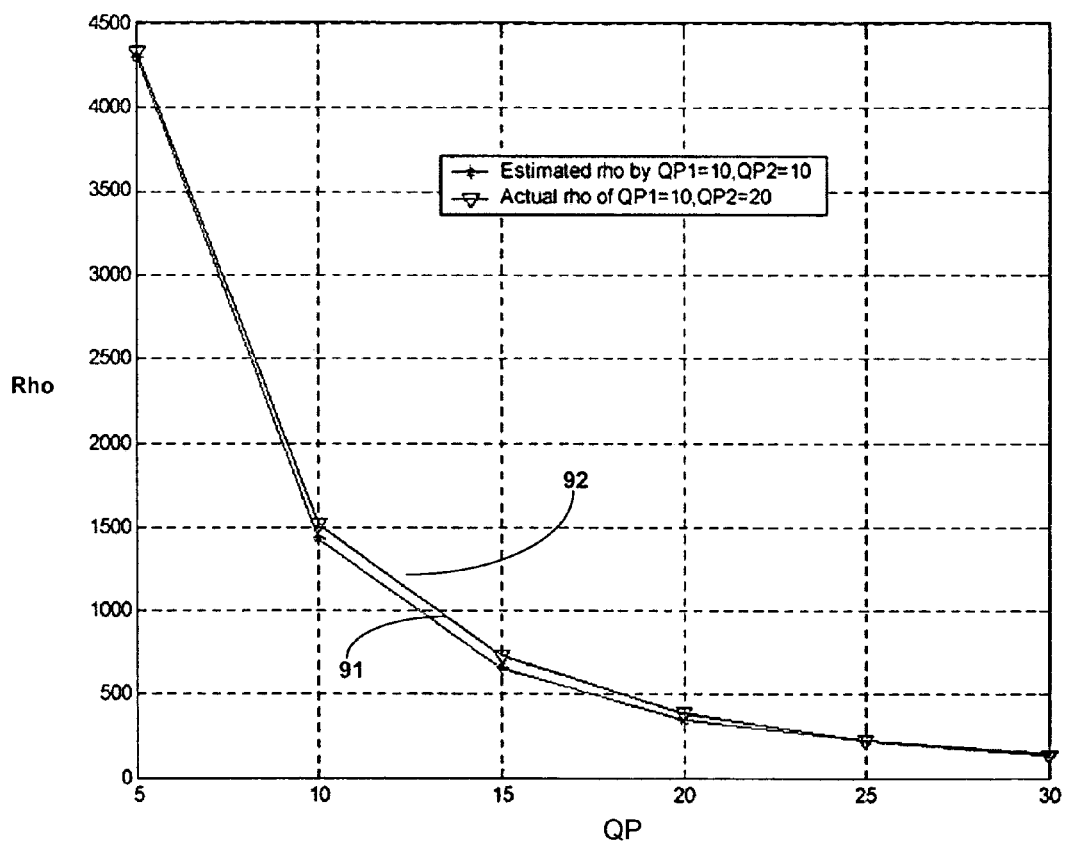

In Equation 11, the value of $\rho_i$ depends on the energy of the motion-compensated residue (which depends on the QP of the preceding frame) and the current frame QP. The accuracy of Equation 11 can be verified by coding a "Football QCIF" sequence (as the same experiment illustrated by the results of FIGS. 3-6) and estimating the rho-QP curve of the fourth frame (with QP=10 for the second frame and QP=20 for the third frame) from the generated first-pass data, which sets both second and third frame QP=10 and uses Equation 11. As shown in FIG. 9, the estimated rho-QP curve 91 is very close to the actual rho-QP curve 92. Similarly, the number of non-texture bits ($B_i$) is also dependent on the energy of the residue and the QP of current frame, as it is modeled by Equation 12. Using equation 13, one can control the value of $A_i$ based on the value of $\rho_i$. The value of $A_i$ is very stable at high-bitrate cases. However, when the $\hat{\rho}_i$ is very small, the $\hat{A}_i$ could become unreasonably high.

So far, this disclosure has developed models for estimating $R_i(Q_{i-1}, Q_i)$ and $D_i(Q_{i-1}, Q_i)$ for all combinations of the candidates of $Q_{i-1}$ and $Q_i$. Assuming the models are accurate, it is possible to develop an desired solution for the problem in Equation 2. In particular, one can use a Lagrangian relaxation approach and it leads to a convex hull approximation of the constrained problem.

Define a Lagrangian cost function as:

$$J_\lambda(\{Q_i\}) = \sum_{i=1}^{N} D_i(Q_{i-1}, Q_i) + \lambda \sum_{i=1}^{N} R_i(Q_{i-1}, Q_i), \quad \text{(Equation 14)}$$

where $\lambda$ is the Lagrange multiplier. If there exists a $\lambda^*$ such that $$\{Q_i\}^* = \arg\left[\min_{\{Q_i\}} J_{\lambda^*}(\{Q_i\})\right] \text{ leads to } R(\{Q_i\}^*) = R_{budget},$$

then $\{Q_i\}^*$ is the desired solution to Equation 2. Therefore, the task of solving Equation 2 equivalent to the easier task of finding the desired solution to the unconstrained problem that minimizes the cost function $J_\lambda(\{Q_i\})$ and choosing the appropriate Lagrange multiplier to satisfy the constraint.

In order to implement the algorithm for solving the problem, one can define a cost function $G_k(Q_{k-1}, Q_k)$, which represents the minimum total bit rate and distortion up to and including the kth frame, given that $Q_{k-1}$ and $Q_k$ are decision vectors for the (k-1)th and kth frames. In this case, k=N, $G_n(Q_{N-1}, Q_N)$ represents the minimum total bitrate and distortion for all the frames, and thus $$\min_{\{Q_i\}} J_\lambda(\{Q_i\}) = \min_{Q_{N-1}, Q_N} G_N(Q_{N-1}, Q_N). \quad \text{(Equation 15)}$$

One key observation for deriving an efficient algorithm is the fact that given decision vectors $Q_{k-2}$ and $Q_{k-1}$ for the (k-2)nd and (k-1)st frames, and the cost function $G_{k-1}(Q_{k-2}, Q_{k-1})$, the selection of the next decision vector $Q_k$ is independent of the selection of the previous decision vectors $Q_1$, $Q_2$, ..., $Q_{k-3}$. This means that the cost function can be expressed recursively as:

$$G_k(Q_{k-1}, Q_k) = \quad \text{(Equation 16)}$$
$$\min_{Q_{k-2}, Q_{k-1}} \{G_{k-1}(Q_{k-2}, Q_{k-1}) + D_k(Q_{k-1}, Q_k) + \lambda R_k(Q_{k-1}, Q_k)\}.$$

The recursive representation of the cost function above makes the future step of the process independent from its past step, which is the foundation of dynamic programming.

The problem can be converted into a graph theory problem of finding the shortest path in a directed acyclic graph (DAG). Such an algorithm is much more efficient than an exhaustive search algorithm with exponential computational complexity.

Experiments were conducted on a number of video clips, and the results of such experiments are discussed in the following text. First, the experiments verified the accuracy of the proposed rate and distortion models by comparing the estimated distortion, A, B and ρ with their actual values in the second pass coding. As shown in FIGS. 10-13, the results in coding a sequence referred to as the "Mother and Daughter" sequence at 80 kbps demonstrate that the proposed estimate model is quite accurate.

Figure 10:
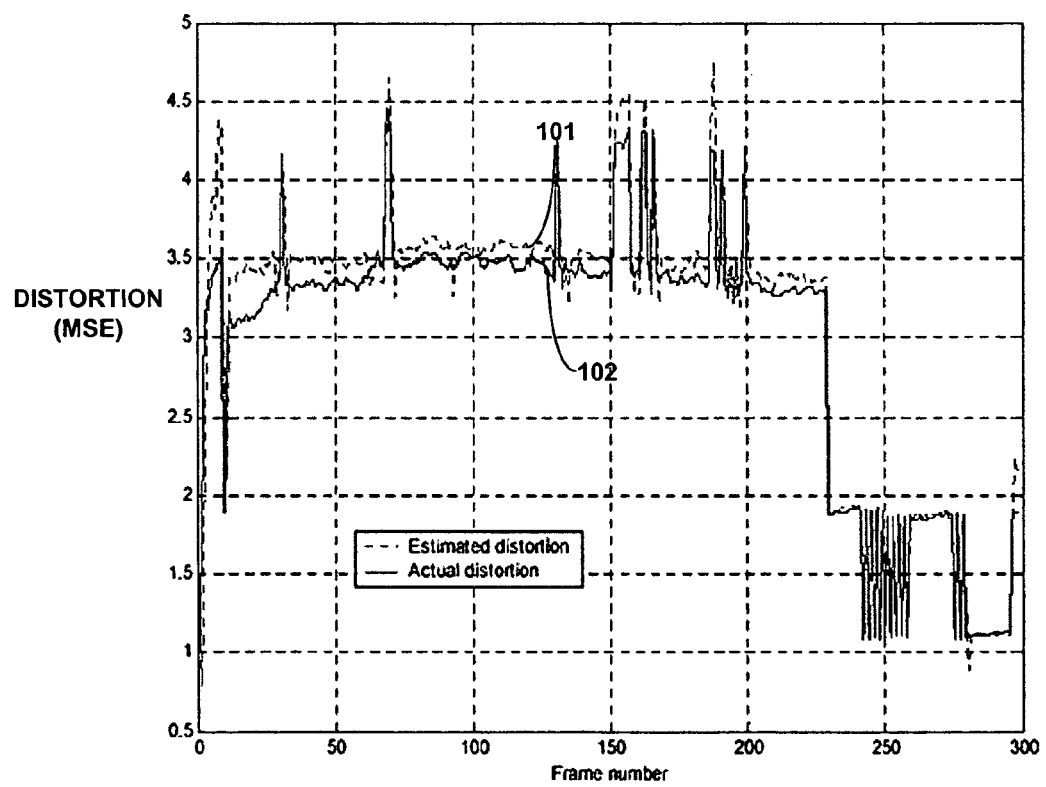
Figure 11:
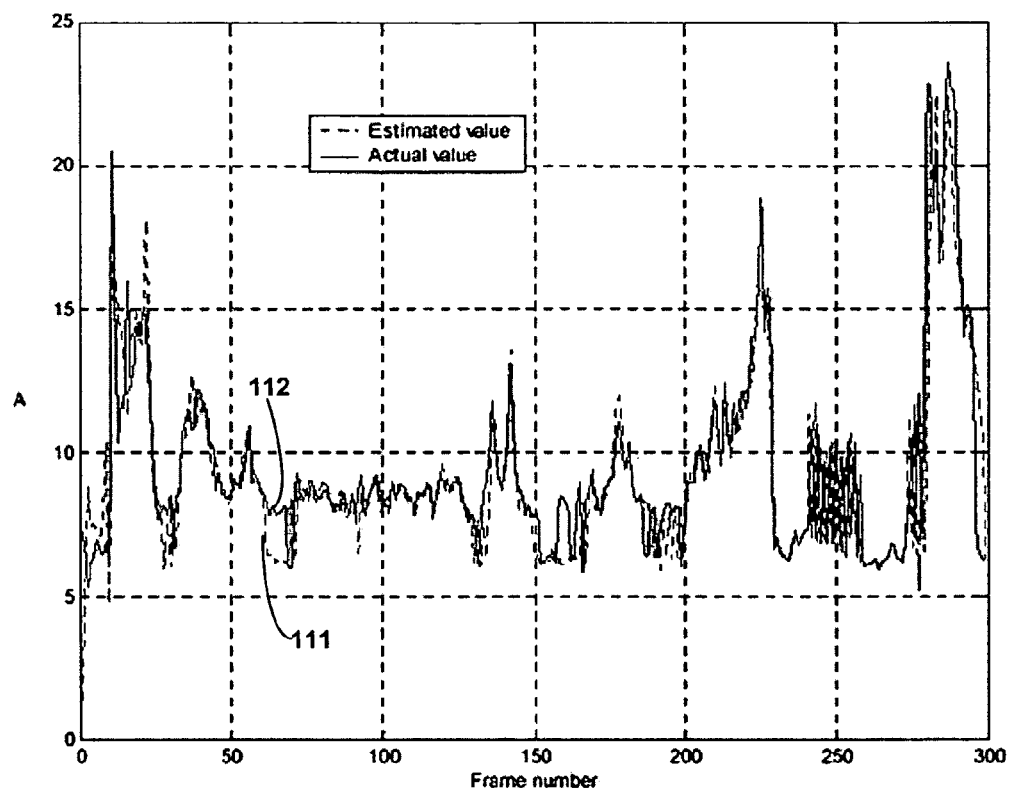
Figure 12:
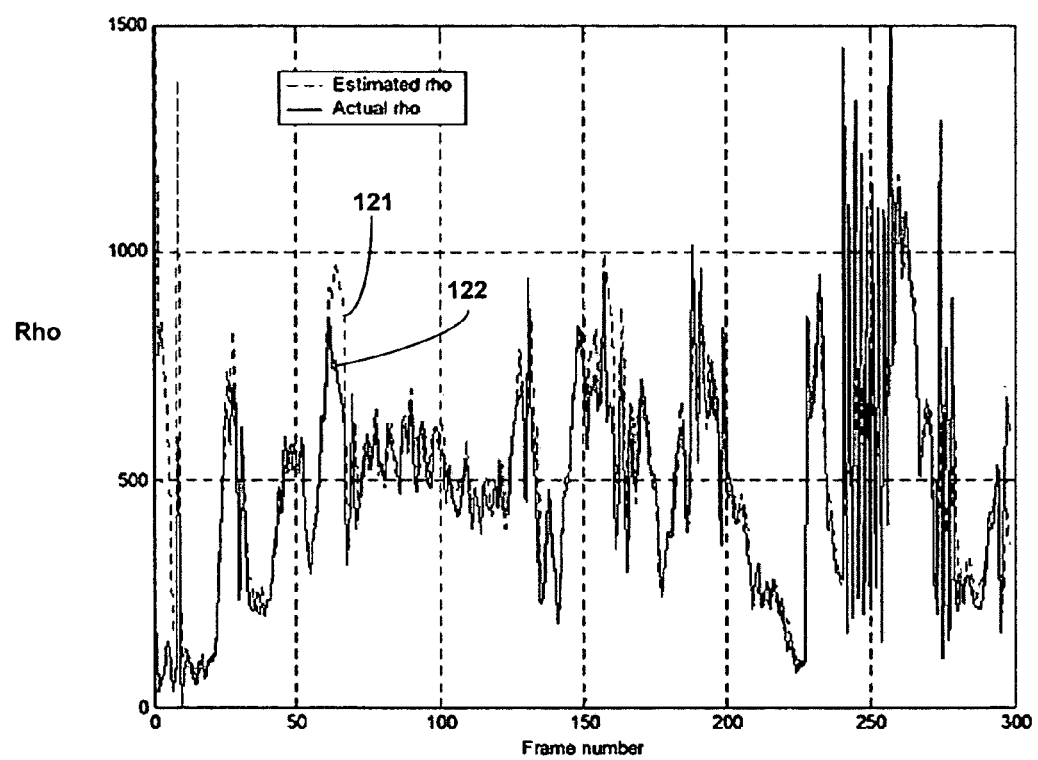
Figure 13:
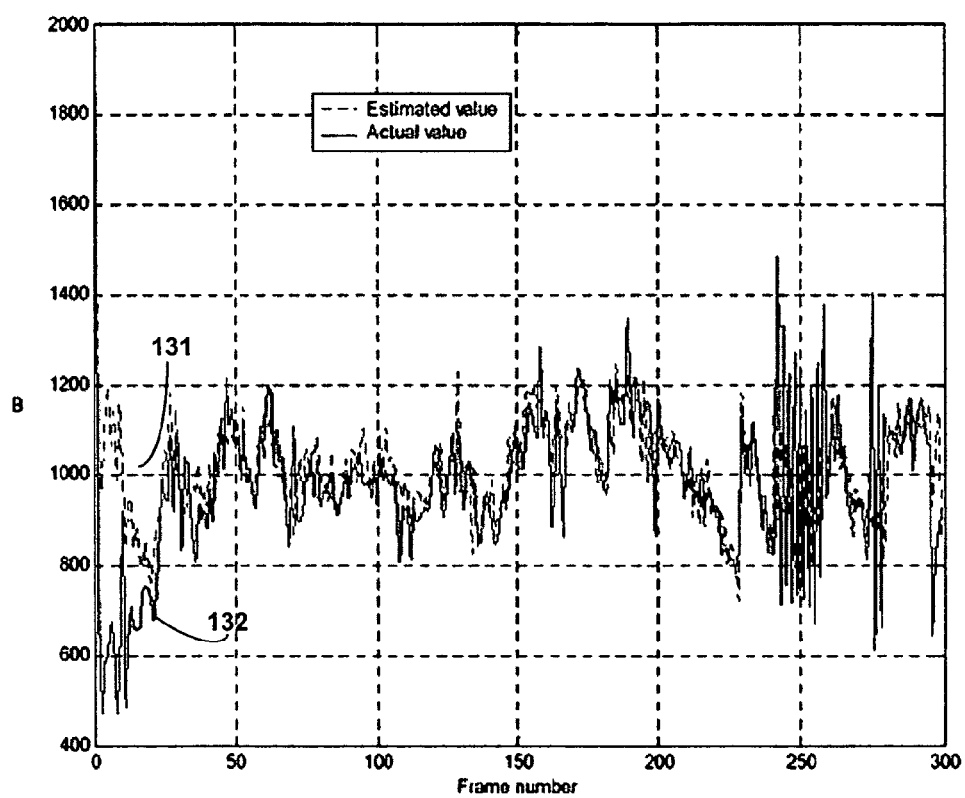

FIG. 10 graphs estimated distortion 101 and actual distortion 102 of the coded "Mother and Daughter" sequence. FIG. 11 compares estimated values of A (labeled 111) with actual values of A (labeled 112) for the coded "Mother and Daughter" sequence. FIG. 12 compares estimated values of ρ (labeled 121) with actual values of ρ (labeled 122) for the coded "Mother and Daughter" sequence. FIG. 13 compares estimated values of B (labeled 131) with actual values of B (labeled 132) for the coded "Mother and Daughter" sequence. The accuracy of the estimated values relative to the actual values is apparent from FIGS. 10-13.

Figure 14:
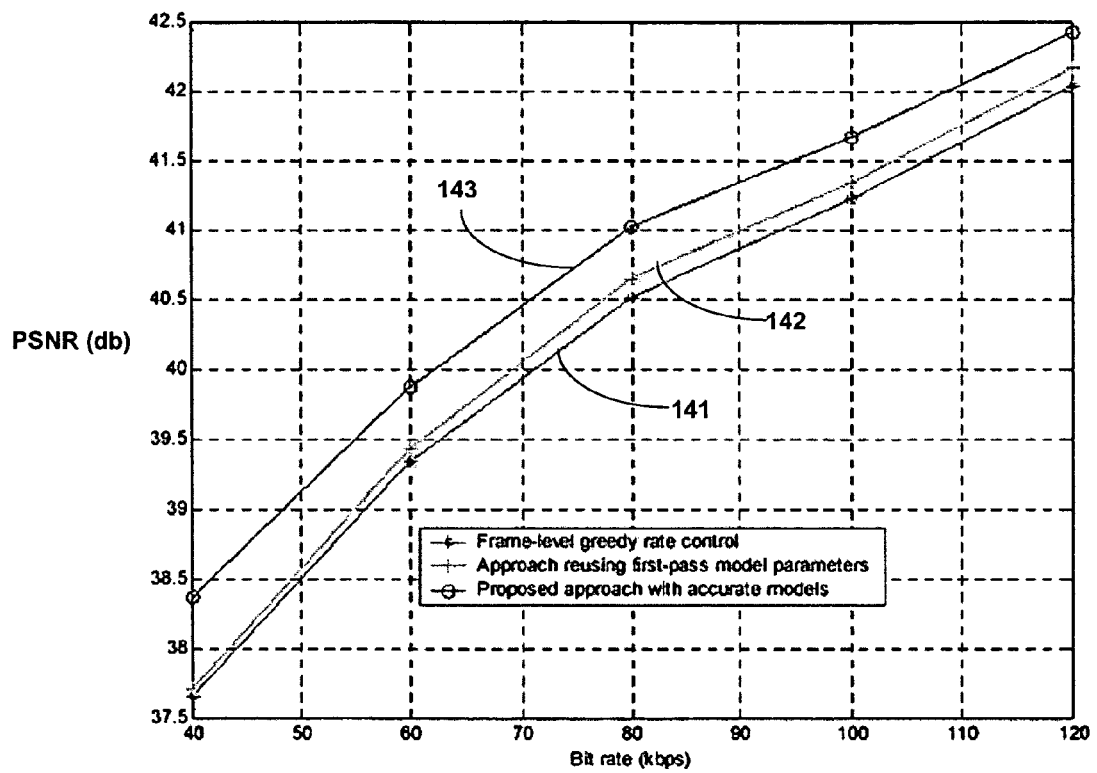

In a second experiment, the "Mother and Daughter" QCIF sequence was coded in ranges of bitrates from 40 kbps to 120 kbps, and the results were compared with two other approaches: (1) Frame-level greedy rate control, which assumes that the future coming frames have uniformly distributed texture complexity and therefore it allocates the remaining bits equally among the future frames; (2) Two-pass rate control using model parameters from the first pass. The results shown in FIG. 14 indicate that the approach in this disclosure has gains of 0.5-0.7 dB gain over the other two approaches in all the bitrate ranges. In FIG. 14 the frame-level greedy rate control approach is labeled 141, the approach reusing first-pass model parameters is labeled 142 and the proposed approach with the accurate models defined herein is labeled 143. The improved results of the proposed approach are evident in FIG. 14.

Figure 15:
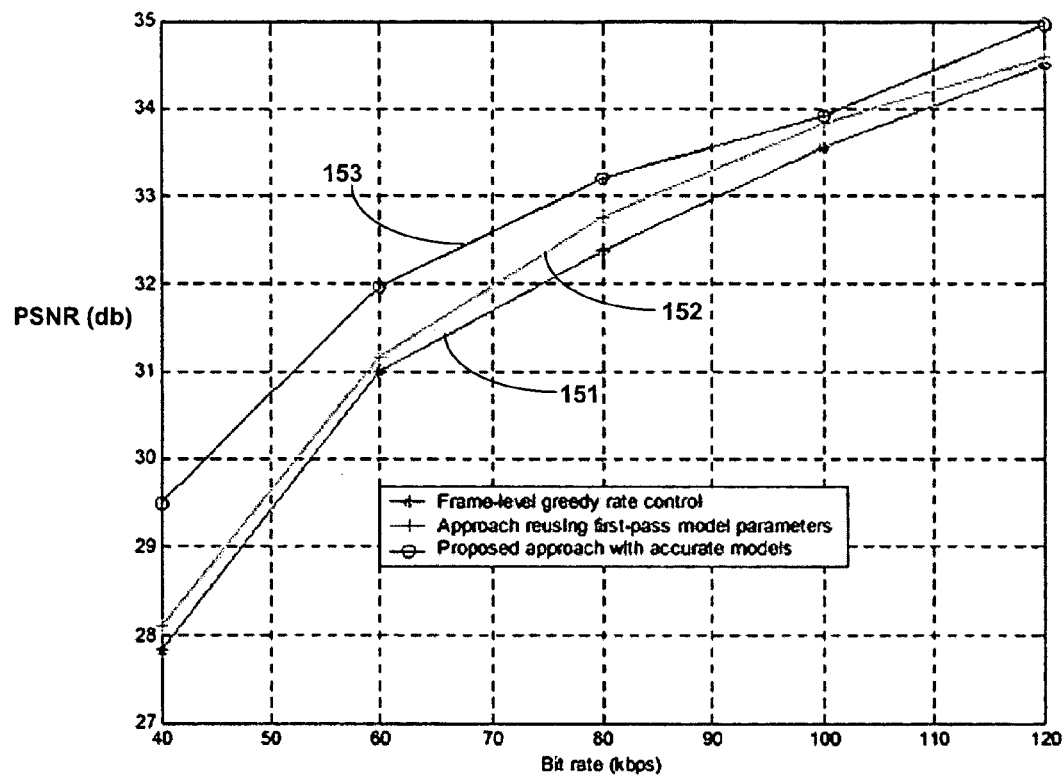

In a third experiment, a video clip containing various segments with different content complexities by composing by simulating three video scenes: the first 100 frames of a standard QCIF test sequence referred to as "Stefan" containing high activity (fast motion), the first 100 frames of a standard QCIF test sequence referred to as "Container" containing low activity (slow motion), and the first 100 frames of a standard QCIF test sequence referred to as "Carphone" containing medium activity (local face movement). The proposed approach was again compared with the two other algorithms used in the previous experiment. The results are shown in FIG. 15, and indicate that the proposed algorithm has significant gains of up to 1.7 dB over the other approaches. The improvements decreases when the bitrate increases. The improvements are expected because the proposed algorithm has the advantage of searching through the candidate space to find a more optimal bit allocation solution for the entire video clip. In FIG. 15, the frame-level greedy rate control approach is labeled 151, the approach reusing first-pass model parameters is labeled 152 and the proposed approach with the accurate models defined herein is labeled 153. The improved results of the proposed approach are evident in FIG. 15.

The techniques outlined above and the results illustrated in FIGS. 3-15 show one embodiment of a model-based two-pass rate control algorithm according to this disclosure. Again, by observing that the quantization parameter selection of the preceding frame has the major impact on the rate-distortion performance of the current frame, the frame dependencies problem was successful simplified and the size candidate space was greatly reduced from exponential to polynomial. After that, a set of accurate models were developed for approximating the rate and distortion status during the practical coding. These models directly enabled the ability to generate a candidate space, and to map the problem into a graph theory problem. With Lagrangian relaxation and dynamic programming, the original constrained problem was converted into an unconstrained problem and solved by the shortest path search algorithm. The experimental results indicate significant gains of up to 1.7 dB compared to other existing rate control algorithms.

Figure 16:
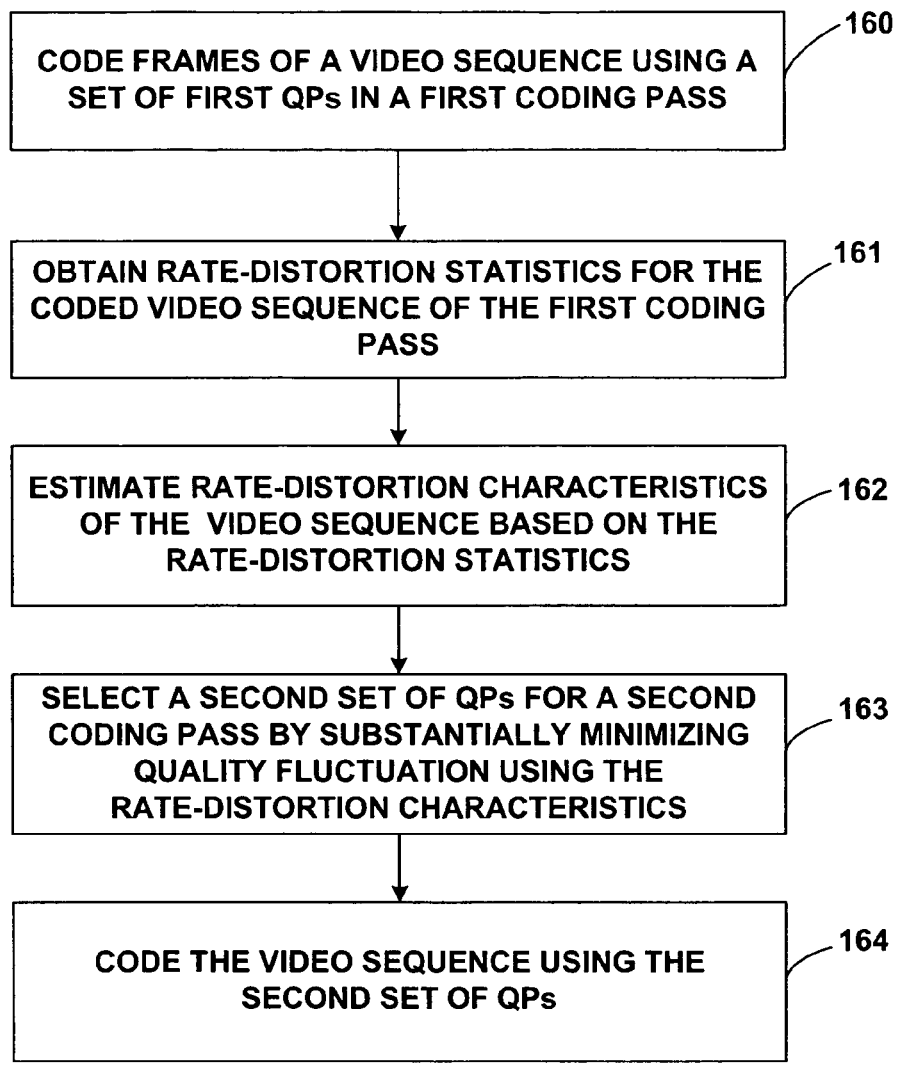
FIG. 16 is a flow diagram illustrating a two-pass rate controlled video coding technique according to an embodiment of this disclosure in which quality fluctuation is minimized for the frames of a video sequence.
Figure 17:
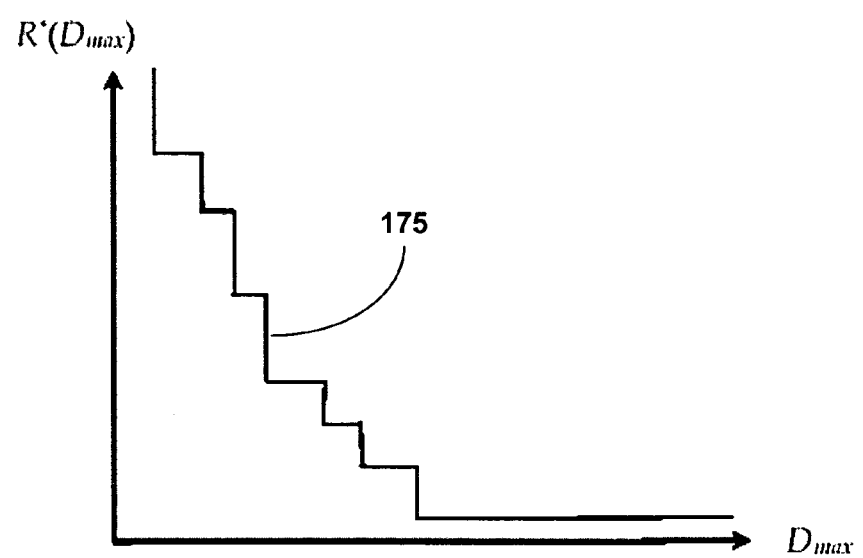
FIGS. 17-26 are additional graphs of data illustrating aspects of the techniques of this disclosure.

FIG. 16 is a flow diagram illustrating a two-pass rate controlled video coding technique according to another embodiment of this disclosure in which quality fluctuation is minimized for the frames of a video sequence. Like FIG. 2, FIG. 16 will be described in the context of video coding device 10 of FIG. 1. As shown in FIG. 16, video coder 14 codes the frames of a video sequence using a first set of QPs (160). Rate control unit 30 then obtains rate-distortion statistics for the coded video sequence of the first coding pass (161). The various other units 24, 26 and 28 of video coder 14 may be implemented in the first coding pass using the set of first QPs identified by rate control unit 30. The first set of QPs may be selected in a variety of different ways, or according to any rate control algorithm. In one example, the first set of QPs are dynamically selected by rate control unit 30 based on a so called "greedy" algorithm that selects a QP for a frame based on a rate budget relative to the number of frames in the sequence, but then reallocates the remaining rate budget over the remaining frames. In another example, the same QP may be pre-selected and used for all frames in the first pass, in which case, the QPs in the first set of QPs are identical to one another. Other techniques, however, could be used to define the first set of QPs for the first coding pass.

After the first coding pass, rate control unit 30 estimates rate-distortion characteristics of the video sequence based on the rate-distortion statistics obtained by the first coding pass (162). In general, the process of estimating the rate-distortion characteristics comprises applying a rate model and a distortion model to the rate-distortion statistics. Rate control unit 30 then selects a second set of QPs for a second coding pass by substantially minimizing quality fluctuation using the rate distortion characteristics (163). In selecting the second set of QPs, rate control unit 30 may also substantially maximize quality of the frames at the substantially minimized quality fluctuation in order to achieve low average frame distortion with the minimized quality fluctuation.

The second set of QPs are different than the first set of QPs and are selected in order to improve the quality of the coding. In this case, the second set of QPs may not minimize distortion across the full sequence, but address another problem that can degrade video quality. Specifically, the technique of FIG. 16 minimizes fluctuation in the coding quality of the different frames, e.g., the technique minimizes rate-distortion fluctuation. In this manner, flickering problems can be reduced or eliminated. Flickering may otherwise occur when the coding quality drastically changes between two successive frames. Once rate control unit 30 has selected the second set of QPs by substantially minimizing quality fluctuation (and possibly maximizing quality at the minimized quality fluctuation), video coder 14 codes the video sequence using the second set of QPs (164).

Like the technique of FIG. 2, in the technique of FIG. 16, the first coding pass may be a lower quality coding pass, but provides the information needed to apply accurate modeling, and account for inter-frame dependencies in the coding of the video sequence. The minimization of rate-distortion may be performed in a wide variety of ways. In one example, substantially minimizing the quality fluctuation comprises substantially minimizing distortion fluctuation at a rate budget for the video sequence. In another example, substantially minimizing the quality fluctuation comprises substantially minimizing QP fluctuation in the second set of QPs at a rate budget for the video sequence. In yet another example, substantially minimizing the quality fluctuation comprises substantially minimizing distortion fluctuation and rate fluctuation at a rate budget for the video sequence. In still another example, substantially minimizing the quality fluctuation comprises minimizing a maximum distortion value associated with the frames of the video sequence. In still another example, substantially minimizing the quality fluctuation comprises reducing a distortion value associated with the frames of the video sequence below a programmable distortion threshold. Additional details of this embodiment are set forth in the following text.

Like the techniques outlined above, the techniques outlined in the following text provide a constant-video-quality oriented two-pass frame-level rate control scheme. However, in the following text, the technique is based on a minimum maximum (MINMAX) distortion criterion. With this framework, given a bit budget for a video sequence, the coder dynamically adjusts the coding parameters for each frame, to minimize the peak maximum frame distortion, which indirectly assures the constant-quality of the reconstituted video sequence. The framework also enables control of the frame-level bitrate fluctuation in the coded sequence with an assigned fluctuation constraint. Based on the iterative adjustment of a threshold, the coder can find a set of coding parameters that satisfy the bit rate constraints. Dynamic programming is applied to improve the coding efficiency. This proposed framework may provide a good choice for bit budget constrained video communication applications, whose goal is to achieve the lowest possible but almost constant distortion, while maintain an acceptable frame-by-frame video quality (i.e., good average PSNR). As noted above, however, the process of substantially minimizing the quality fluctuation can be done in a number of other ways as well.

The following develops a set of accurate rate and distortion estimation models to approximate the practical rate and distortion status in the second-pass coding. The models are again based on the observation that the rate and distortion of current frame are highly dependent on the QP of its preceding frame, and the QP selection of the previous frames earlier than the last one has very little impact on the performance of the current frame. The models and observations enable the significant reduction of the computational complexity of the process of QP selection in a two-pass approach. By mapping the problem into a graph theory problem, a shortest path algorithm is applied to find the optimal solution efficiently. The proposed techniques have been simulated and tested. The experimental results have shown significant reduction of up to 70% of the peak signal to noise ratio (PSNR) fluctuation compared to the greedy frame-level rate control algorithm.

There are several alternative meanings for "overall video quality", such as good average quality per frame, constant frame quality, and good perceptual video quality, just to name a few. However, there is generally no standardized unified video quality measurement available to take all aspects into account. In general, the minimum average distortion (MINAVE) criterion is mostly used to measure video distortion. Frame-level rate control algorithms have been proposed in attempts to achieve the best average PSNR of the decoded video sequence. However, conventional solutions with MINAVE criterion sometimes lead to unequal distortion across frames, which cause "flickering problems" due to abrupt quality changes between frames. Some recent study have focused on how to reduce the distortion variation across the sequence while maintain an acceptable per frame PSNR. However, these approaches are mainly designed for real-time applications with stringent delay constraints, and therefore the performance is often poor.

As an alternative approach to a MINAVE approach, a minimum maximum (MINMAX) distortion approach may be a good choice for applications whose goal is to achieve an almost constant distortion. The philosophy behind this approach is that by minimizing the maximum source distortion, no single source distortion will be extremely high, and hence, the overall quality will be quite constant. This disclosure proposes a two-pass constant-quality rate control algorithm based on the MINMAX criterion. Accurate rate and distortion estimation models are established for frame level QP selection. The models are again based on an observation that the frame distortion highly depends on the level of quantization of its preceding frame, while the quantization selection of frames earlier than the previous frame has very little impact on the frame distortion of the current frame. In the models described herein, the actual distortion during the second pass coding can be approximated by a function of the distortion in the first pass (using the same QP), the energy of the motion-compensated residue in the first pass, and the distortion of the preceding frame in the first pass. In addition, this disclosure studies the impact of reducing rate fluctuation on the proposed rate control scheme and proposes a solution for achieving both tasks.

The proposed technique may represent a hybrid framework that is capable of achieving low fluctuations in both PSNR and bitrate by dynamically choosing the coding parameters using a minimum maximum distortion criterion. Also, the framework may work together with a set of accurate estimation models for frame rate and distortion. Approximations in the calculation can effectively speed up the coding performance by reducing the sampling and space from exponential to polynomial.

The problem in this embodiment is that of choosing the quantization parameter for each frame to achieve a decoded video sequence with least quality fluctuation, while maintaining an acceptable overall average PSNR and meeting certain rate fluctuation constraints, based on the statistics collected during the first-pass coding. Although the problem of how to do the first-pass coding is relevant, to simplify the problem, one can assume that a greedy frame-level bit allocation algorithm is used to code the frame at the first pass. Other QP selection techniques, however, could alternatively be used in the first pass.

A model for the frame bit rate as a function of $\rho$, which is the number of non-zero quantized DCT coefficients in the frame, can be represented by:

$$R = A\rho + B,$$

where A and B are constant modeling parameters, and A represents the average number of bits needed to code a non-zero quantized DCT coefficients and B represents the bits due to non-texture information, such as prediction modes and motion vectors.

Let N denote the number of total frames in the processed video sequence, and $\{\hat{Q}_i\}$, $\{\hat{A}_i\}$, $\{\hat{B}_i\}$, $\{\hat{\rho}_i\}$, $\{\hat{\tau}_i^2\}$, and $\{\hat{D}_i\}$ (i=1, 2, . . . , N) the quantization parameter QP, the average number of bits per non-zero quantized DCT coefficients, the number of bits for coding non-texture information, the number of non-zero quantized DCT coefficients, the energy of the motion-compensated residue, and the distortion of the ith frame resulted in the first pass coding, respectively. As used above, the variables identified by a "^" are variables estimated by the first coding pass. Variables without the identifier "^" are generally second pass variables, e.g., either approximations or second pass variables to be solved.

Let $R_{budget}$ denote the total bit budget for the video sequence, $R_{dev\_}^{threshold}$ the maximum allowed deviation of the actual frame bitrate from the average bitrate, and $\{Q_i\}$, $\{R_i\}$ and $\{D_i\}$ the QP, bit rate and distortion of the ith frame in the second-pass coding. Therefore, a representation for the problem is:

$$\text{Minimize}_{\{Q_i\}} \quad \text{(Equation 17)}$$

$$\sum_{i=1}^{N}\left[D_i(Q_1, Q_2, \ldots, Q_i) - \frac{1}{N}\sum_{i=1}^{N}D_i(Q_1, Q_2, \ldots, Q_i)\right]^2,$$

$$\text{and Minimize}_{\{Q_i\}} \sum_{i=1}^{N} D_i(Q_1, Q_2, \ldots, Q_i),$$

$$\text{such that } \sum_{i=1}^{N} R_i(Q_1, Q_2, \ldots, Q_i) \leq R_{budget},$$

$$\text{and } \left|R_i(Q_1, Q_2, \ldots, Q_i) - \frac{R_{budget}}{N}\right| \leq R_{dev\_threshold}$$

$$\text{for } i = 1, 2, \ldots, N.$$

where both $R_i$ and $D_i$ are functions of $Q_1, Q_2, \ldots, Q_i$, due to the nature of the predictive coding. In addition, $R_i(\hat{Q}_1, \hat{Q}_2, \ldots, \hat{Q}_i) = \hat{A}_i \hat{\rho}_i + \hat{B}_i$, and $D_i(\hat{Q}_1, \hat{Q}_2, \ldots, \hat{Q}_i) = \hat{D}_i$ (i=1, . . . N).

In Equation 17, both mean and variance of the distortion are minimized with the given bit budget for the sequence. However, Equation 17 does not guarantee a solution because the QP selection that minimized the mean distortion might not be able to minimize the variance of the distortion, and vice-versa. A weighted approach can be used to modify the problem of Equation 17 into the form of:

$$\text{Minimize}_{\{Q_i\}} \sum_{i=1}^{N}\left[(1-\alpha)\left(D_i(Q_1, Q_2, \ldots, Q_i) - \frac{1}{N}\sum_{i=1}^{N}D_i(Q_1, Q_2, \ldots, Q_i)\right)^2 + \alpha\frac{1}{N}\sum_{i=1}^{N}D_i(Q_1, Q_2, \ldots, Q_i)\right], \quad \text{(Equation 18)}$$

$$\text{such that } \sum_{i=1}^{N} R_i(Q_1, Q_2, \ldots, Q_i) \leq R_{budget},$$

$$\text{and } \left|R_i(Q_1, Q_2, \ldots, Q_i) - \frac{R_{budget}}{N}\right| \leq R_{dev\_threshold}$$

$$\text{for } i = 1, 2, \ldots, N.$$

where $\alpha \in [0,1]$ is a weighted factor that defines the relative importance of the mean and variance of the distortion. As expected, increasing $\alpha$ reduces the distortion variances in the cost of increased mean distortion. However, the determination of $\alpha$ is quite difficult without a user's interaction.

In accordance with this disclosure, the problem can be formalized by:

$$\text{Minimize}_{\{Q_i\}} \max_{i \in [1,2,\ldots,N]} \quad \text{(Equation 19)}$$

$$\left(D_i(Q_1, Q_2, \ldots, Q_i) - \frac{1}{N}\sum_{i=1}^{N}D_i(Q_1, Q_2, \ldots, Q_i)\right)^2,$$

$$\text{such that } \sum_{i=1}^{N} R_i(Q_1, Q_2, \ldots, Q_i) \leq R_{budget},$$

$$\text{and } \left|R_i(Q_1, Q_2, \ldots, Q_i) - \frac{R_{budget}}{N}\right| \leq R_{dev\_threshold}$$

$$\text{for } i = 1, 2, \ldots, N.$$

Moreover, the problem can be further simplified as:

$$\text{Minimize}_{\{Q_i\}} \max_{i \in [1,2,\ldots,N]} \left|D_i(Q_1, Q_2, \ldots, Q_i) - \frac{1}{N}\sum_{i=1}^{N}\hat{D}_i(\hat{Q}_1, \hat{Q}_2, \ldots, \hat{Q}_i)\right|, \quad \text{(Equation 20)}$$

$$\text{such that } \sum_{i=1}^{N} R_i(Q_1, Q_2, \ldots, Q_i) \leq R_{budget},$$

$$\text{and } \left|R_i(Q_1, Q_2, \ldots, Q_i) - \frac{R_{budget}}{N}\right| R_{dev\_threshold}$$

$$\text{for } i = 1, 2, \ldots N.$$

based on the assumptions that a target result is to achieve constant video quality, and that one does not expect a big difference in the mean distortion between the first pass and the second pass.

Again, frame dependencies can be simplified based on an observation that the QP selection of the preceding frame has the major impact on the rate-distortion performance of the current frame. In other words, given the observations of frame dependencies according to this disclosure, one can reduce the i-tuple functions $R_i(Q_1, Q_2, \ldots, Q_i)$ and $D_i(Q_1, Q_2, \ldots, Q_i)$ to 2-tuple functions $R_i(Q_{i-1}, Q_i)$ and $D_i(Q_{i-1}, Q_i)$ because the selections of $Q_1, Q_2, \ldots, Q_{i-2}$ would not cause significant change on the rate and distortion for the ith frame. Hence, if the tables of $R_i(Q_{i-1}, Q_i)$ and $D_i(Q_{i-1}, Q_i)$ are obtained for all combinations of the candidates of $Q_{i-1}$ and $Q_i$, the problem of Equation 20 can solved directly simplifying the problem into:

$$\text{Minimize}_{\{Q_i\}} \max_{i \in [1,2,\ldots,N]} \left| D_i(Q_{i-1}, Q_i) - \frac{1}{N} \sum_{i=1}^{N} \hat{D}_i(\hat{Q}_1, \hat{Q}_2, \ldots, \hat{Q}_i) \right|, \quad \text{(Equation 21)}$$

$$\text{such that} \sum_{i=1}^{N} R_i(Q_{i-1}, Q_i) \leq R_{budget},$$

$$\text{and } \left| R_i(Q_{i-1}, Q_i) - \frac{R_{budget}}{N} \right| \leq R_{dev\_threshold}$$

for $i = 1, 2, \ldots, N$.

The problem of Equation 21 can be solved by first solving another problem, that is $$\text{Minimize} \sum_{i=1}^{N} R_i(Q_{i-1}, Q_i), \quad \text{(Equation 22)}$$

such that $$\max_{i \in [1,2,\ldots,N]} \left| D_i(Q_{i-1}, Q_i) - \frac{1}{N} \sum_{i=1}^{N} D_i(Q_1, Q_2, \ldots, Q_i) \right| \leq D_{max},$$

$$\text{and } \left| R_i(Q_{i-1}, Q_i) - \frac{R_{budget}}{N} \right| \leq R_{dev\_threshold}$$

for $i = 1, 2, \ldots, N$.

This can be done by assuming that the distortion is a non-increasing function of the bit rate for the CODEC. In other words, one assumes that by increasing the number of available bits the CODEC's performance will either remain the same or improve. Hence, when $D_{max}$ sweeps from zero to infinity, $R^*(D_{max})$, the solution to Equation 22 traces out the staircase-like curve 175 shown in FIG. 17. Therefore, a bisection can be used to find the $D^*_{max}$ that satisfies $R^*(D^*_{max}) \geq R_{budget}$, and therefore solves problem Equation 21.

In order to implement an algorithm to solve Equation 22, one can create a cost function $C_k(Q_{k-1}, Q_k)$, which represents the minimum total rate up to and including the kth frame with the distortion constraint in Equation 22, given that $Q_{k-1}$ and $Q_k$ are QPs for the (k-1)st and kth frames. Thus, the solution for $$\min_{Q_{N-1}, Q_n} C_N(Q_{N-1}, Q_N)$$

is also the desired solution for Equation 22.

One key observation for deriving an efficient algorithm is the fact that given decision vectors $Q_{k-2}$ and $Q_{k-1}$ for the (k-1)st and kth frames, and the cost function $C_{k-1}(Q_{k-2}, Q_{k-1})$, the selection of the next decision vector $Q_k$ is independent of the selection of the previous decision vectors $Q_1, Q_2, \ldots, Q_{k-3}$. This is true because the cost function can be expressed recursively as $$C_k(Q_{k-1}, Q_k) = \quad \text{(Equation 23)}$$
$$\min_{Q_{k-2}, Q_{k-1}} [C_{k-1}(Q_{k-2}, Q_{k-1}) + p_k(Q_{k-1}, Q_k)],$$

where $$p_k(Q_{k-1}, Q_k) = \quad \text{(Equation 24)}$$
$$\begin{cases} \infty & \text{if } D_k(Q_{k-1}, Q_k) > D_{max} \\ \infty & \text{if } \left| R_k(Q_{k-1}Q_k) - \frac{R_{budget}}{N} \right| > R_{dev\_threshold} \\ R_k(Q_{k-1}, Q_k) & \text{otherwise.} \end{cases}$$

The recursive representation of the cost function above makes any future step of an optimization process independent from the previous steps, which is the foundation of dynamic programming.

With the cost function defined by Equation 23, this problem can be converted into a graph theory problem of finding the shortest path in a directed acyclic graph (DAG). This solution is much more efficient than the exponential computational complexity of an exhaustive search algorithm.

Estimation models can be used for rate and distortion. That is:

$$D_i(Q_{i-1}, Q_i) \approx \quad \text{(Equation 25)}$$

$$D_i(\hat{Q}_{i-1}, Q_i) \frac{\hat{\sigma}_i^2(\hat{Q}_{i-1}) + D_{i-1}(Q_{i-2}, Q_{i-1}) - \hat{D}_{i-1}(\hat{Q}_{i-2}, \hat{Q}_{i-1})}{\sigma_i^2(\hat{Q}_{i-1})},$$

and $$R_i(Q_{i-1}, Q_i) = A_i \rho_i + B_i, \quad \text{(Equation 26)}$$

where $$\rho_i \approx \hat{\rho}_i \sqrt{\frac{\hat{\sigma}_i^2(\hat{Q}_{i-1}) + D_{i-1}(Q_{i-2}, Q_{i-1}) - \hat{D}_{i-1}(\hat{Q}_{i-2}, \hat{Q}_{i-1})}{\hat{\sigma}_i^2(\hat{Q}_{i-1})}}, \quad \text{(Equation 27)}$$

$$B_i \approx \hat{B}_i \sqrt{\frac{\hat{\sigma}_i^2(\hat{Q}_{i-1}) + D_{i-1}(Q_{i-2}, Q_{i-1}) - \hat{D}_{i-1}(\hat{Q}_{i-2}, \hat{Q}_{i-1})}{\hat{\sigma}_i^2(\hat{Q}_{i-1})}} \left[ \frac{\hat{\rho}_i(Q_i)}{\hat{\rho}_i(\hat{Q}_i)} \right]^{\frac{1}{8}}, \quad \text{(Equation 28)}$$

and $$A_i \approx \begin{cases} \hat{A}_i & \text{if } \hat{\rho}_i > \dfrac{M}{256} \\ \dfrac{256 * \hat{A}_i \hat{\rho}_i}{M} & \text{if } \dfrac{M}{512} < \hat{\rho}_i < \dfrac{M}{256} \\ \dfrac{128 * \hat{A}_i \hat{\rho}_i}{M} & \text{otherwise} \end{cases} \quad \text{(Equation 29)}$$

By replacing the estimated rate and distortion in Equations 25-29 into Equations 22-24, the problem or Equation 5 can be solved efficiently.

Experiments were conducted on a number of standard video test sequences, including video sequences identified as "Table tennis," "Foreman," and "Dancer," in bitrate ranges from 60 kbps to 120 kbps. The results are reported in the following text.

A first set of experiments focused on the constant-quality features of the algorithm outlined in FIG. 16 by loosening the bitrate fluctuation constraint. The proposed MINMAX approach outlined above was compared with two other approaches: (1) Frame-level greedy rate control, which assumes that the future coming frames have uniformly distributed texture complexity and therefore it allocates the remaining bits equally among the future frames, and (2) a MINMAX approach with higher PSNR expectation, that is, a MINMAX approach that also seeks constant-quality but requires same level of average PSNR to be achieved in the second pass as that of the first pass. The problem formulation is shown in Equation 30 as follows, $$\underset{\{Q_i\}}{\text{Minimize}} \quad \text{(Equation 30)}$$

$$\max_{i \in [1,2,...,N]} \left| D_i(Q_{i-1}, Q_i) - \frac{1}{N} \sum_{i=1}^{N} \hat{D}_i(\hat{Q}_1, \hat{Q}_2, \ldots, \hat{Q}_i) \right|,$$

$$\text{such that } \sum_{i=1}^{N} R_i(Q_{i-1}, Q_i) \leq R_{budget} \text{ and}$$

$$\left| \sum_{i=1}^{N} D_i(Q_{i-1}, Q_i) - \sum_{i=1}^{N} \hat{D}_i(\hat{Q}_1, \hat{Q}_2, \ldots, \hat{Q}_i) \right| < \varepsilon,$$

where $\varepsilon$ is a very small number. Equation 30 is very similar to Equation 21 except the additional constraint on the average PSNR.

Figure 18:
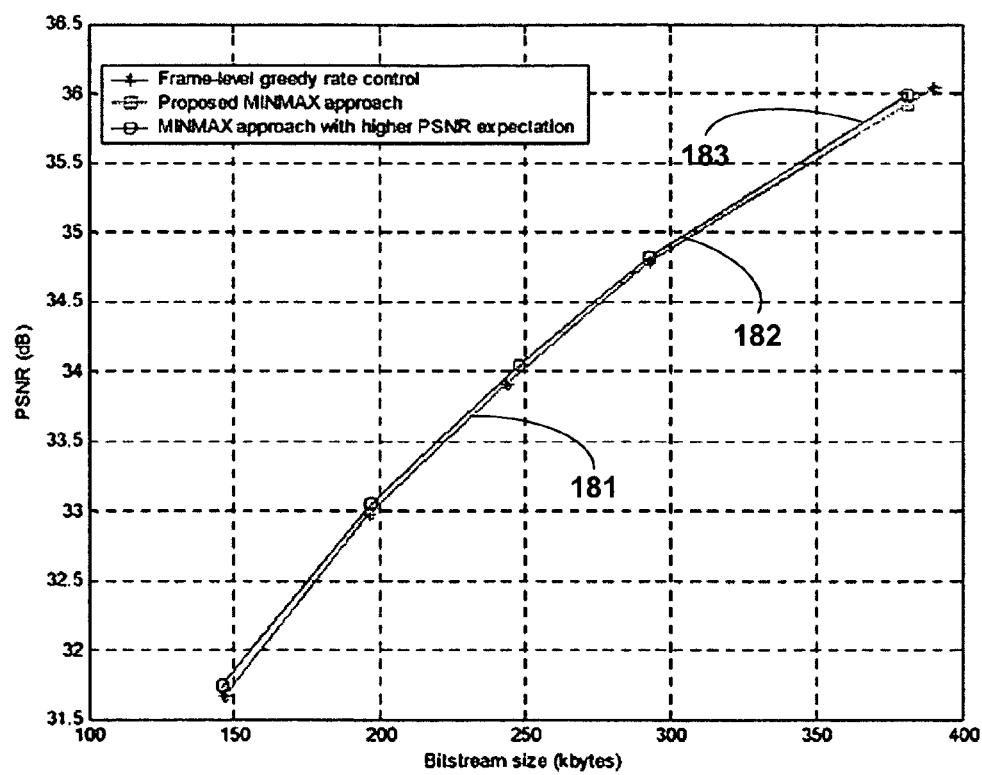
Figure 19:
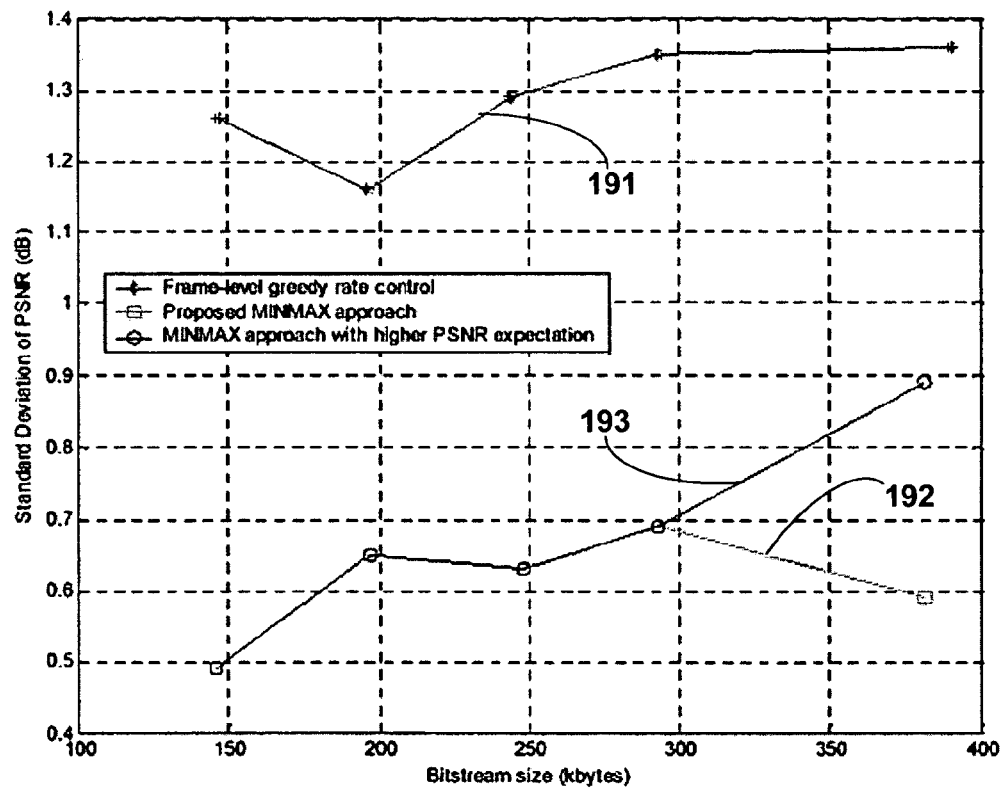
Figure 20:
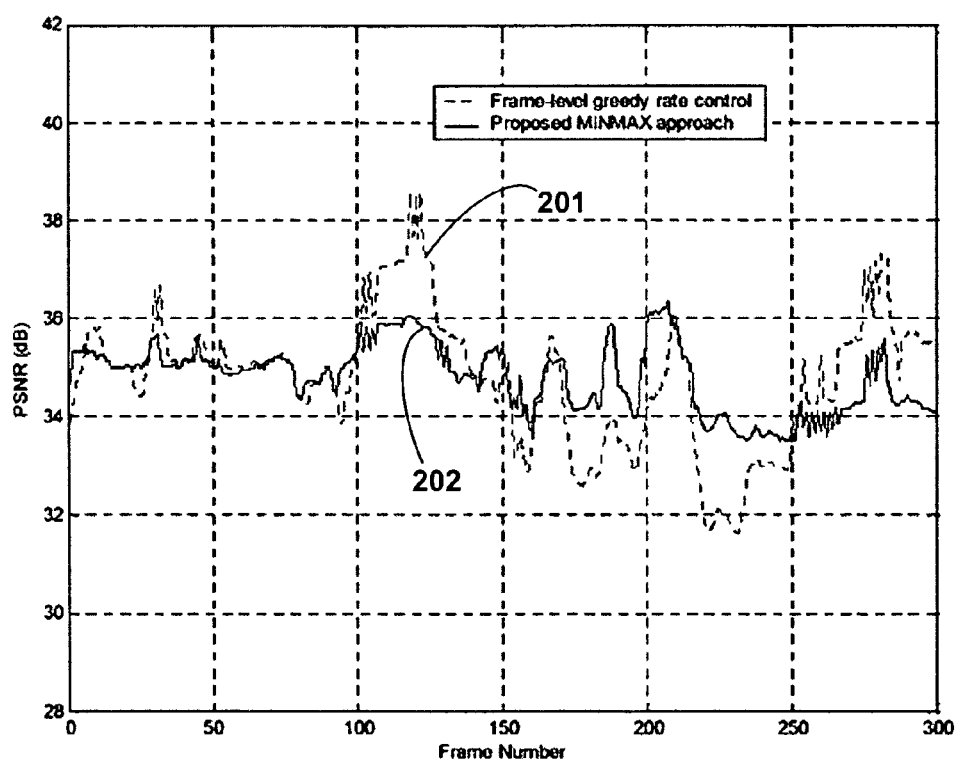

In FIGS. 18-20, the testing results on the "Foreman" sequence are shown. In this example, all three approaches have similar rate-distortion performance, but the MINMA approaches reduced the standard deviation of the frame PSNR by 50%. The detailed PSNR distribution is shown in FIG. 20 to demonstrate the reduction of the PSNR fluctuation by using MIMMAX approach. In FIG. 18, the greedy frame level rate control approach is labeled 181, the proposed MINMAX approach is labeled 182, and a modified MINMAX approach that has higher PSNR expectation is labeled 183. In FIG. 19, the greedy frame level rate control approach is labeled 191, the proposed MINMAX approach is labeled 192, and a modified MINMAX approach that has higher PSNR expectation is labeled. 193. In FIG. 20, the greedy frame level rate control approach is labeled 201, and the proposed MINMAX approach is labeled 202.

Figure 21:
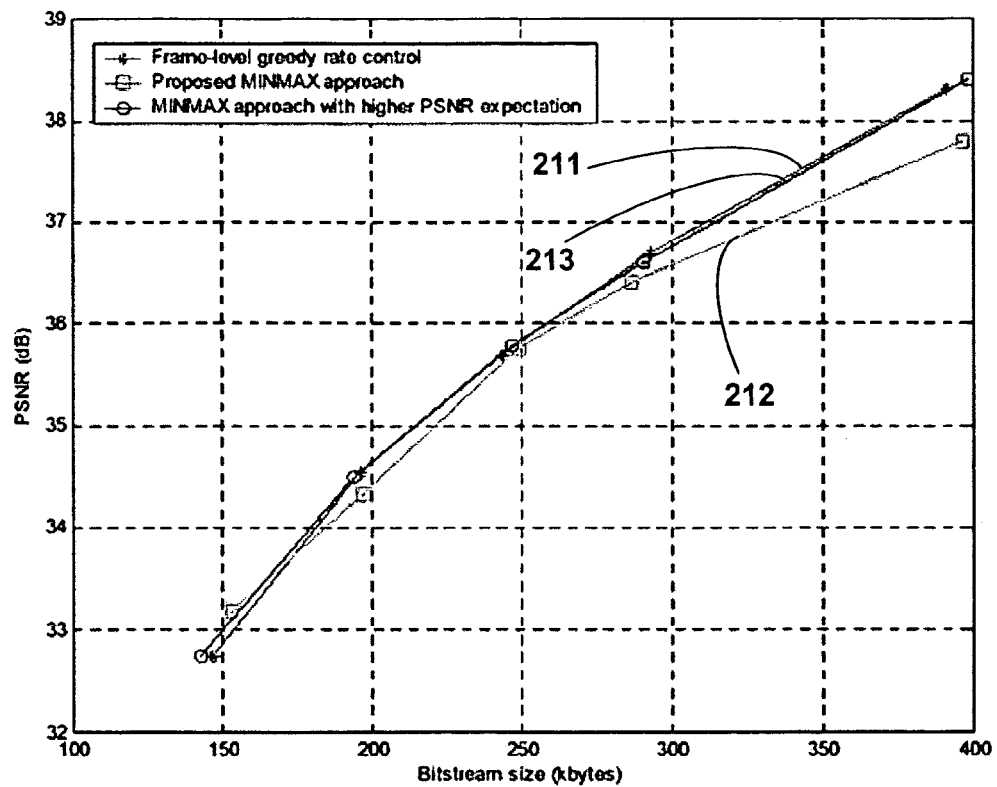
Figure 22:
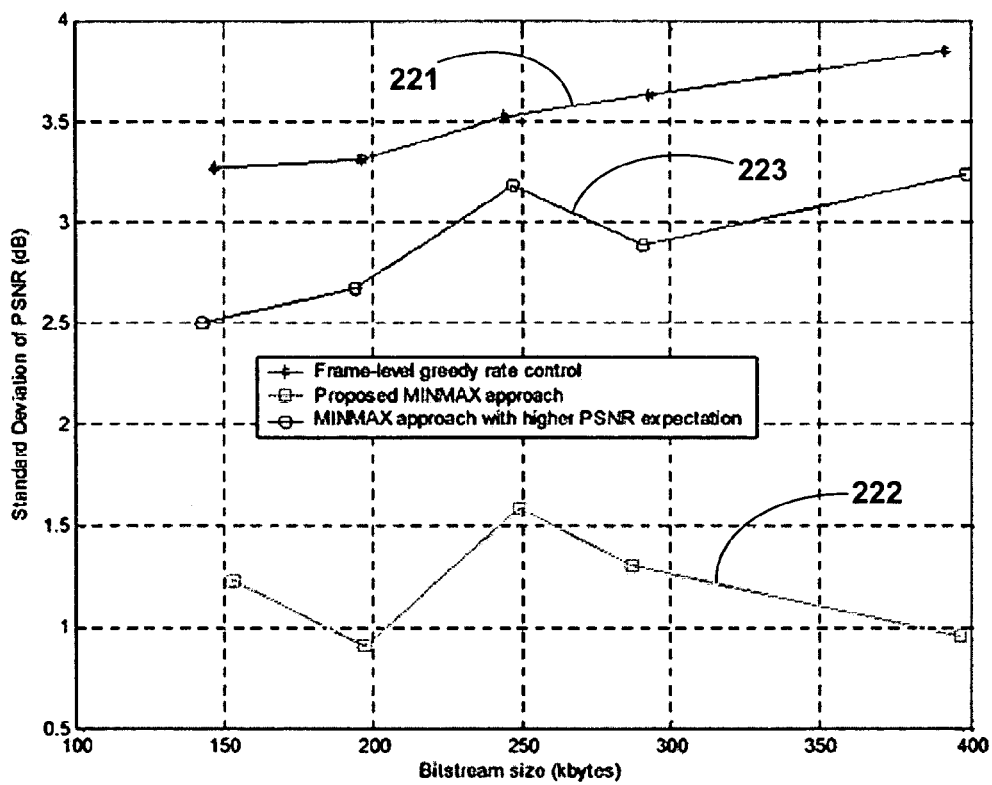

Testing results on "Table tennis" sequence are shown in FIGS. 21-22. As expected, the proposed MINMAX approach has lower average frame PSNR, but it reduces the PSNR fluctuation from the greedy algorithm by 60-70%. The MINMAX approach with higher PSNR expectation obtained PSNR similar to that of the greedy algorithm with the reduction in PSNR fluctuation by 20-30%. In FIG. 21, the greedy frame level rate control approach is labeled 211, the proposed MINMAX approach is labeled 212, and a modified MINMAX approach that has higher PSNR expectation is labeled. 213. In FIG. 22, the greedy frame level rate control approach is labeled 221, the proposed MINMAX approach is labeled 222, and a modified MINMAX approach that has higher PSNR expectation is labeled 223.

Figure 23:
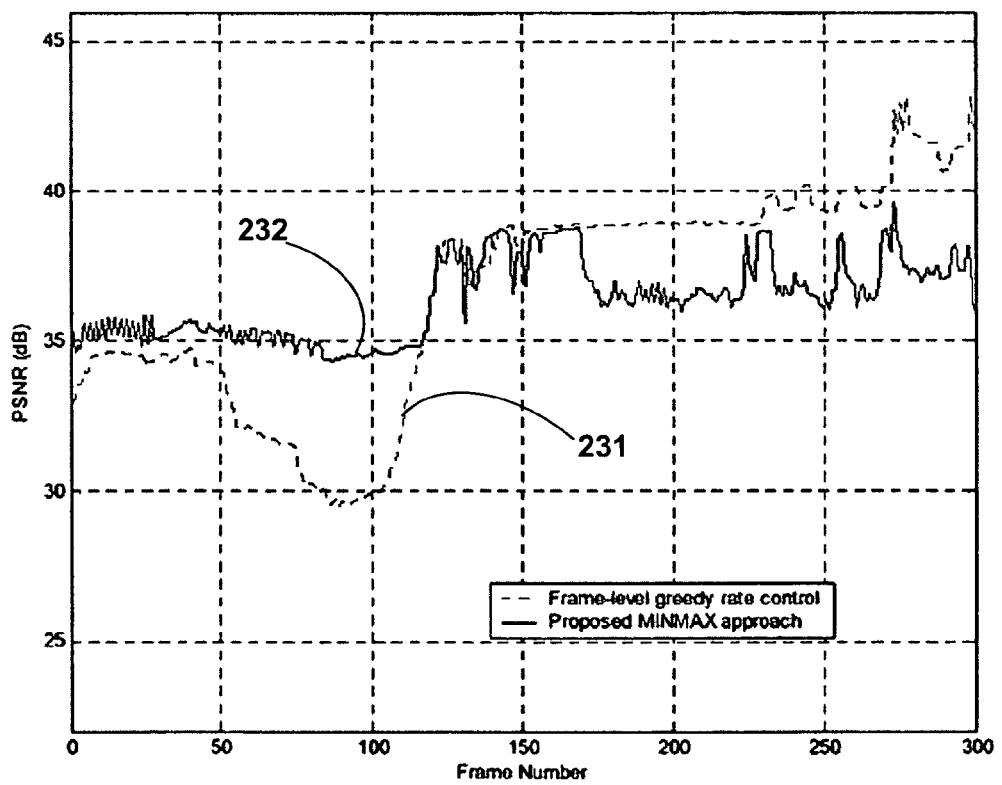
Figure 24:
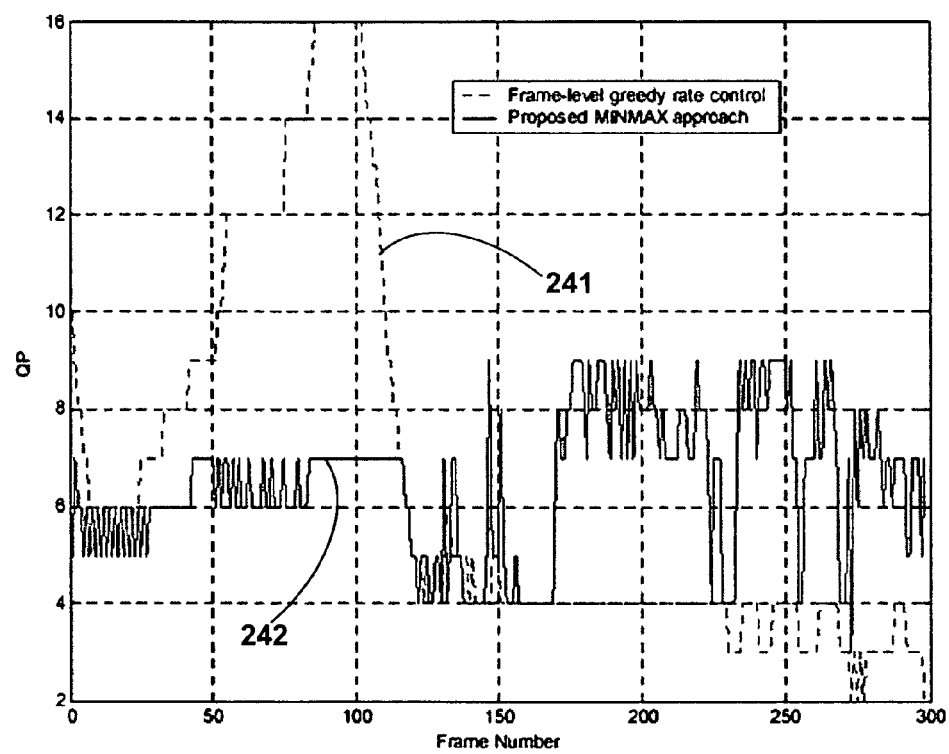

FIG. 23 is a graph showing detailed PSNR distributions in the "Table tennis" sequence when bitrate equals to 120 kbps. FIG. 24 is a graph showing detailed QP distributions in the "Table tennis" sequence when bitrate equals 120 kbps. In FIG. 23, the greedy frame level rate control approach is labeled 231, and the proposed MINMAX approach is labeled 232. In FIG. 24, the greedy frame level rate control approach is labeled 241, and the proposed MINMAX approach is labeled 242.

Figure 25:
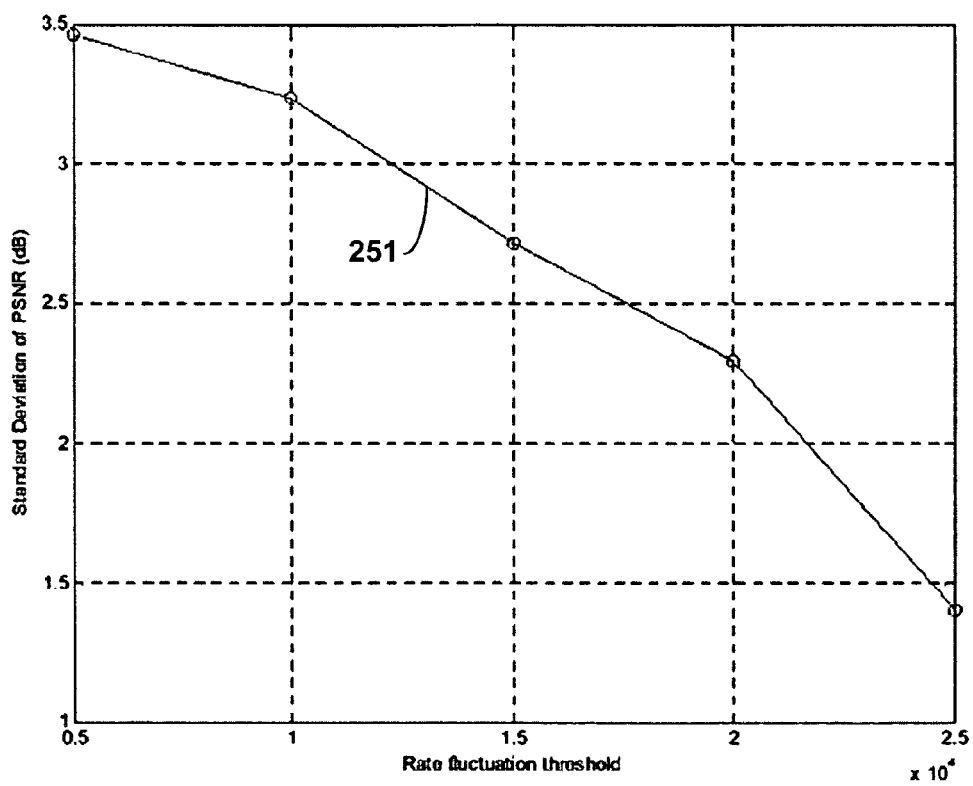
Figure 26:
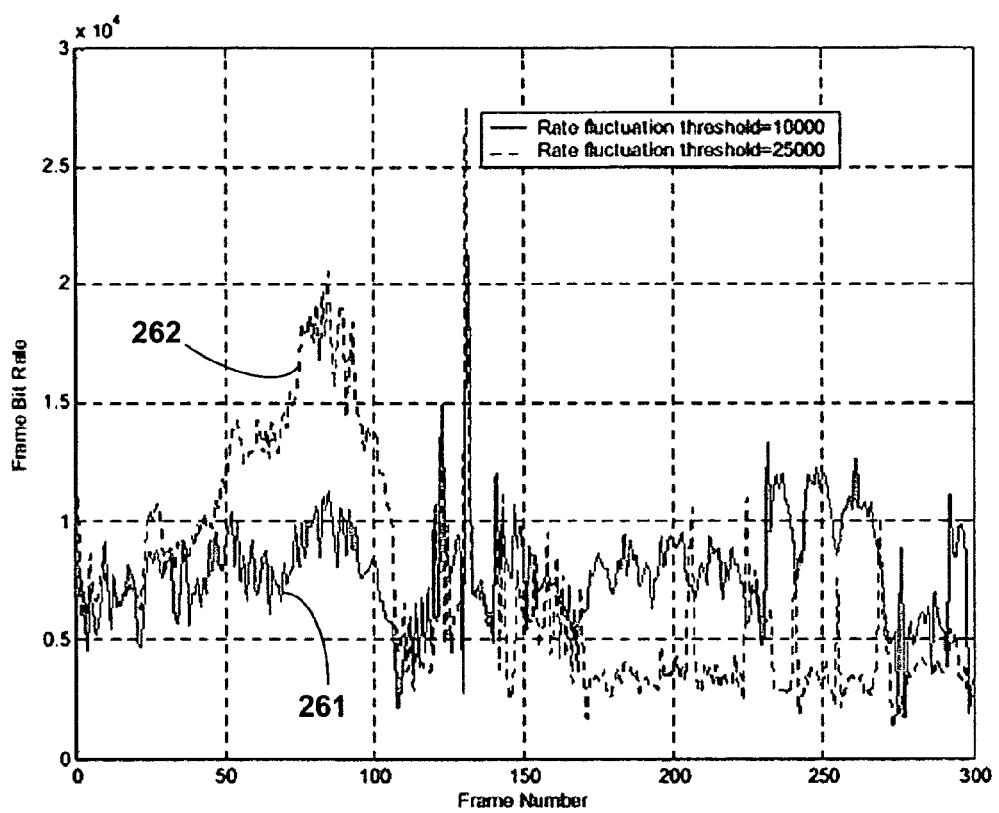

FIGS. 25 and 26 illustrate the impact of the bitrate fluctuation constraint on the system performance by coding the "Table tennis" sequence at 120 kbps with various settings of the bitrate fluctuation threshold in the range of 5000 and 25000. FIG. 25, specifically, illustrates a curve 251 of the standard deviation of PSNR as a function of a bit rate fluctuation threshold. As expected, the PSNR fluctuation decreases when the threshold increases as shown in FIG. 25.

The detail rate fluctuation is also compared in FIG. 26. Specifically, curve 261 is corresponds to the rate fluctuation threshold being 10000 and curve 262 corresponds to the rate fluctuation threshold being 25000. Clearly, with a tighter threshold, the resulted bit rate for the sequence is much smoother. It is important to notice that by using this threshold, the techniques can dynamically control the bit rate fluctuation, like using a virtual buffer, to avoid buffer overflow and underflow, as well as maintain a constant-video-quality characteristic of coded video sequence.

The described MINMAX frame-level rate control algorithm can be used to minimize the peak maximum frame distortion, which indirectly assures the constant-quality of the reconstituted video sequence. The rate fluctuation in a video sequence can be controlled by a programmable threshold in the video coding device. The video coding device can be developed with a set of accurate rate and distortion models based on an observation that the quantization parameter selection of the preceding frame has the major impact on the rate-distortion performance of the current frame. The observation simplifies the frame dependencies problem, and thus reduces the size of the candidate space from exponential to polynomial. The experimental results set forth in the Graphs of FIGS. 17-26 indicate significant reduction of up to 70% of the PSNR standard deviation across the video sequence relative to a conventional greedy algorithm approach.

A number of embodiments have been described. In particular, various rate control techniques have been proposed that use a "two-pass" approach in which a first coding pass is used to estimate characteristics of the video sequence, and the estimated characteristics are then used to improve upon the selection of quantization parameters (QPs) for the second pass. More specifically, two basic alternatives, consistent with this disclosure, have been proposed. In the first case, the estimated rate-distortion characteristics of the first pass are used to select QPs for the second pass in a manner that minimizes distortion of the frames of the video sequence. In the second case, the estimated rate-distortion characteristics of the first pass are used to select QPs for the second pass in a manner that minimizes quality fluctuation between the frames of the video sequence.

The techniques described herein may be implemented in hardware, software, firmware, or any combination thereof. If implemented in software, the techniques may be directed to a computer readable medium comprising program code, that when executed in a device that codes video sequences, performs one or more of the techniques described herein. In that case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, and the like.

The program code may be stored on memory in the form of computer readable instructions. In that case, a processor such as a DSP may execute instructions stored in memory in order to carry out one or more of the techniques described herein. In some cases, the techniques may be executed by a DSP that invokes various hardware components to accelerate the coding process. In other cases, the video coder may be implemented as a microprocessor, one or more application specific integrated circuits (ASICs), one or more field programmable gate arrays (FPGAs), or some other hardware-software combination.

Although the two approaches have been described separately, various aspects of the two approaches may also be used in combination. Therefore, various aspects of the different techniques may be combined in still other embodiments contemplated by this disclosure. Also, although two pass approaches have been described, even more passes could also be performed in accordance with this disclosure. In other words, this disclosure is not limited to a two-pass approach, but is more broadly applicable to any multi-pass approach in which at least two coding passes are used. These and other embodiments are within the scope of the following claims.

The invention claimed is:

1. A video coding device comprising:
   means for coding frames of the video sequence based at least in part on a set of first quantization parameters (QPs) in a first coding pass;
   means for obtaining rate-distortion statistics for the coded video sequence of the first coding pass;
   means for estimating rate-distortion characteristics of the video sequence based on the rate-distortion statistics and quantization parameters of a first frame and a second frame in the video sequence; and
   means for reducing quality fluctuation between the frames of the video sequence in a second coding pass, the means for reducing quality fluctuation configured to select a second set of QPs for the second coding pass of the frames in the video sequence based at least in part on the estimated rate-distortion characteristics.

2. The video coding device of claim 1, further comprising means for substantially maximizing quality of the frames at the reduced quality fluctuation.

3. The video coding device of claim 1, further comprising means for coding the video sequence using the set of second QPs in the second coding pass.

4. The video coding device of claim 1, wherein the means for estimating estimates the rate-distortion characteristics based on application of a rate model and a distortion model to the rate-distortion statistics.

5. The video coding device of claim 1, wherein the means for reducing substantially minimizes distortion fluctuation at a rate budget for the video sequence to substantially minimize the quality fluctuation.

6. The video coding device of claim 1, wherein the means for reducing substantially minimizes QP fluctuation in the second set of QPs at a rate budget for the video sequence to substantially minimize the quality fluctuation.

7. The video coding device of claim 1, wherein the means for reducing substantially minimizes distortion fluctuation and rate fluctuation at a rate budget for the video sequence to substantially minimize the quality fluctuation.

8. The video coding device of claim 1, further comprising means for dynamically selecting the first set of QPs based on a greedy algorithm that uses a rate budget to define each QP in the first set.

9. The video coding device of claim 1, wherein the means for reducing substantially minimizes a maximum distortion value associated with the frames of the video sequence to substantially minimize the quality fluctuation.

10. The video coding device of claim 1, wherein the means for reducing substantially minimizes a distortion value associated with the frames of the video sequence below a programmable distortion threshold to substantially minimize the quality fluctuation.

11. The video coding device of claim 1, wherein the means for estimating rate-distortion characteristics applies a rate model and distortion model to the rate-distortion statistics.

12. The video coding device of claim 11, wherein the rate model and the distortion model are approximated to a two-tuple function of the quantization parameters in the first pass and the quantization parameters of the preceding frame in the first pass, and wherein the means for reducing quality fluctuation between the frames of the video sequence reduces a distortion value associated with the frames of the video sequence below a programmable distortion threshold.

13. A method comprising:
   coding frames of a video sequence based at least in part on a set of first quantization parameters (QPs) in a first coding pass;
   obtaining rate-distortion statistics for the coded video sequence;
   estimating rate-distortion characteristics of the video sequence based on the rate-distortion statistics and quantization parameters of a first frame and a second frame in the video sequence; and
   reducing quality fluctuation between the frames of the video sequence in a second coding pass, wherein reducing quality fluctuation includes selecting a second set of QPs for the second coding pass of the frames in the video sequence based at least in part on the estimated rate-distortion characteristics.

14. The method of claim 13, further comprising substantially maximizing quality of the frames at the reduced quality fluctuation.

15. The method of claim 13, further comprising coding the video sequence using the set of second QPs in the second coding pass.

16. The method of claim 13, wherein estimating the rate-distortion characteristics comprises applying a rate model and a distortion model to the rate-distortion statistics.

17. The method of claim 13, wherein reducing the quality fluctuation comprises substantially minimizing distortion fluctuation at a rate budget for the video sequence.

18. The method of claim 13, wherein reducing the quality fluctuation comprises substantially minimizing QP fluctuation in the second set of QPs at a rate budget for the video sequence.

19. The method of claim 13, wherein reducing the quality fluctuation comprises substantially minimizing distortion fluctuation and rate fluctuation at a rate budget for the video sequence.

20. The method of claim 13, further comprising dynamically selecting the first set of QPs based on a greedy algorithm that uses a rate budget to define each QP in the first set.

21. The method of claim 13, wherein reducing the quality fluctuation comprises minimizing a maximum distortion value associated with the frames of the video sequence.

22. The method of claim 13, wherein reducing the quality fluctuation comprises substantially minimizing a distortion value associated with the frames of the video sequence below a programmable distortion threshold.

23. The method of claim 13, wherein estimating rate-distortion characteristics comprises applying a rate model and distortion model to the rate-distortion statistics.

24. The method of claim 23, wherein the rate model and the distortion model are approximated to a two-tuple function of the quantization parameters in the first pass and the quantization parameters of the preceding frame in the first pass, and wherein the means for reducing quality fluctuation between the frames of the video sequence reduces a distortion value associated with the frames of the video sequence below a programmable distortion threshold.

25. A non-transitory computer readable medium comprising program code that when executed in a video coding device:
codes frames of the video sequence based at least in part on a set of first quantization parameters (QPs) in a first coding pass;
obtains rate-distortion statistics for a video sequence based on the coded video sequence of the first coding pass;
estimates rate-distortion characteristics of the video sequence based on the rate-distortion statistics and quantization parameters of a first frame and a second frame in the video sequence; and
reduces quality fluctuation between the frames of the video sequence in a second coding pass, wherein reducing quality fluctuation includes selecting a second set of QPs for a second coding pass of the frames in the video sequence based at least in part on the estimated rate-distortion characteristics.

26. The non-transitory computer readable medium of claim 25, further comprising program code that selects the second set of QPs to substantially maximize quality of the frames at the reduced quality fluctuation.

27. The non-transitory computer readable medium of claim 25, further comprising program code that codes the video sequence using the set of second QPs in the second coding pass.

28. The non-transitory computer readable medium of claim 25, wherein the program code applies a rate model and a distortion model to the rate-distortion statistics to estimate the rate-distortion characteristics.

29. The non-transitory computer readable medium of claim 25, wherein the program code substantially minimizes distortion fluctuation at a rate budget for the video sequence to reduce the quality fluctuation.

30. The non-transitory computer readable medium of claim 25, wherein the program code substantially minimizes QP fluctuation in the second set of QPs at a rate budget for the video sequence to reduce the quality fluctuation.

31. The non-transitory computer readable medium of claim 25, wherein the program code substantially minimizes distortion fluctuation and rate fluctuation at a rate budget for the video sequence to reduce the quality fluctuation.

32. The non-transitory computer readable medium of claim 25, wherein the program code dynamically selects the first set of QPs based on a greedy algorithm that uses a rate budget to define each QP in the first set.

33. The non-transitory computer readable medium of claim 25, wherein the program code substantially minimizes a maximum distortion value associated with the frames of the video sequence to reduce the quality fluctuation.

34. The non-transitory computer readable medium of claim 25, wherein the program code substantially minimizes a distortion value associated with the frames of the video sequence below a programmable distortion threshold to reduce the quality fluctuation.

35. A video coding device comprising:
a video memory configured to store a video sequence;
a local memory configured to store at least part of the video sequence during video coding; and
a video coder configured to:
code frames of a video sequence based at least in part on a set of first quantization parameters (QPs) in a first coding pass;
obtain rate-distortion statistics for the coded video sequence;
estimate rate-distortion characteristics of the video sequence based on the rate-distortion statistics and quantization parameters of a first frame and a second frame in the video sequence;
reduce quality fluctuation between the frames of the video sequence in a second coding pass, wherein reducing quality fluctuation includes selecting a second set of QPs for the second coding pass of the frames in the video sequence based at least in part on the estimated rate-distortion characteristics; and
code the video sequence based at least in part on the second set of QPs in a second coding pass.

36. The video coding device of claim 35, wherein the video coder includes a motion estimator, a motion compensator, a residual coder, and a rate control unit, wherein the motion estimator, the motion compensator, and the residual coder code the video sequence using the first set of QPs in the first coding pass and code the video sequence using the second set of QPs in the second coding pass, and wherein the rate control unit obtains the rate-distortion statistics, estimates rate-distortion characteristics, and substantially minimizes quality fluctuation to select the second set of QPs.

37. The video coding device of claim 36, further comprising a video capture device to capture the video sequence and a transmitter to transmit the coded video sequence of the second coding pass.

38. The video coding device of claim 35, wherein the video coder includes a spatial estimator, an intra-frame prediction unit, a residual coder, and a rate control unit, wherein the spatial estimator, the intra-frame prediction unit, and the residual coder code the video sequence using the first set of QPs in the first coding pass and code the video sequence using the second set of QPs in the second coding pass, and wherein the rate control unit obtains the rate- distortion statistics, estimates rate-distortion characteristics, and substantially minimizes quality fluctuation to select the second set of QPs.

39. A video coder implemented as one or more microprocessors, application specific integrated circuits (ASICs), field programmable gate arrays (FPGAs), hardware, or combinations of hardware and software, wherein the video coder is configured to:
- code frames of a video sequence based at least in part on a set of first quantization parameters (QPs) in a first coding pass;
- obtain rate-distortion statistics for the coded video sequence;
- estimate rate-distortion characteristics of the video sequence based on the rate-distortion statistics;
- reduce quality fluctuation between the frames of the video sequence in a second coding pass, wherein reducing quality fluctuation includes selecting a second set of QPs for the second coding pass of the frames in the video sequence based at least in part on the estimated rate-distortion characteristics and quantization parameters of a first frame and a second frame in the video sequence; and
- code the video sequence based at least in part on the second set of QPs in a second coding pass.

40. The non-transitory computer readable medium of claim 25, wherein the program code is further configured to estimate rate-distortion characteristics of the video sequence based on the rate-distortion statistics by applying a rate model and distortion model to the rate-distortion statistics.

41. The non-transitory computer readable medium claim 40, wherein the rate model and the distortion model are approximated to a two-tuple function of the quantization parameters in the first pass and the quantization parameters of the preceding frame in the first pass, and wherein the means for reducing quality fluctuation between the frames of the video sequence reduces a distortion value associated with the frames of the video sequence below a programmable distortion threshold.

* * * * *